United States Patent
Zhang et al.

(10) Patent No.: US 10,128,928 B2
(45) Date of Patent: Nov. 13, 2018

(54) CHANNEL STATE INFORMATION CSI REPORTING METHOD AND APPARATUS, AND BASE STATION ANTENNA

(71) Applicant: Huawei Technologies Co., Ltd., Shenzhen (CN)

(72) Inventors: Leiming Zhang, Beijing (CN); Yongxing Zhou, Beijing (CN); Jianghua Liu, Beijing (CN); Kunpeng Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/365,653

(22) Filed: Nov. 30, 2016

(65) Prior Publication Data
US 2017/0099093 A1   Apr. 6, 2017

Related U.S. Application Data

(63) Continuation of application No. PCT/CN2014/079010, filed on May 30, 2014.

(51) Int. Cl.
*G01C 11/02* (2006.01)
*H04B 7/06* (2006.01)
*H04B 7/0456* (2017.01)

(52) U.S. Cl.
CPC ......... *H04B 7/0626* (2013.01); *H04B 7/0456* (2013.01); *H04B 7/0634* (2013.01); *H04B 7/0639* (2013.01)

(58) Field of Classification Search
None
See application file for complete search history.

(56) References Cited

U.S. PATENT DOCUMENTS

| 8,737,507 B2 | 5/2014 | Astely et al. |
| 9,209,877 B2 | 12/2015 | Wang et al. |

(Continued)

FOREIGN PATENT DOCUMENTS

| CN | 102273091 A | 12/2011 |
| CN | 102299775 A | 12/2011 |

(Continued)

OTHER PUBLICATIONS

"Extension of Rel-8 codebook for dual stage Rel-10 precoder," 3GPP TSG RAN Working Group 1 Meeting 60bis, Beijing, China, R1-102409, 3rd Generation Partnership Project, Valbonne, France (Apr. 12-16, 2010).

(Continued)

*Primary Examiner* — Edan Orgad
*Assistant Examiner* — Sithu Ko
(74) *Attorney, Agent, or Firm* — Leydig, Voit & Mayer, Ltd.

(57) ABSTRACT

The present invention discloses a channel state information CSI reporting method and apparatus, and a base station antenna. In the method, at least one precoding matrix is selected from a codebook based on a reference signal sent by a base station, and CSI is sent to the base station. The CSI includes at least one selected precoding matrix indicator PMI, and the PMI is corresponding to the selected at least one precoding matrix. At least one precoding matrix W included in the codebook may be expressed as $W = W_1 \otimes W_2$, where $\otimes$ is a Kronecker product, and at least one of $W_1$ or $W_2$ is an antenna selection matrix. Therefore, in embodiments of the present invention, the base station can select, according to the at least one precoding matrix that is fed back, one or more antenna ports to send a signal.

16 Claims, 11 Drawing Sheets

(56) References Cited

U.S. PATENT DOCUMENTS

| | | | |
|---|---|---|---|
| 9,214,996 B2 | 12/2015 | Kim et al. | |
| 2010/0322343 A1 | 12/2010 | Yeon et al. | |
| 2011/0205930 A1* | 8/2011 | Rahman | H04B 7/0417 370/252 |
| 2012/0219042 A1* | 8/2012 | Onggosanusi | H04B 7/0456 375/219 |
| 2014/0098689 A1* | 4/2014 | Lee | H04B 7/0469 370/252 |
| 2014/0226702 A1* | 8/2014 | Onggosanusi | H04B 7/0469 375/219 |

FOREIGN PATENT DOCUMENTS

| | | |
|---|---|---|
| CN | 103782533 A | 5/2014 |
| JP | 2012531087 A | 12/2012 |
| WO | 2013024351 A1 | 2/2013 |
| WO | WO 2014007591 A1 | 1/2014 |

OTHER PUBLICATIONS

"Considerations on CSI feedback enhancements for high-priority antenna configurations," 3GPP TSG-RAN WG1#66 Athens, Greece R1-112420, 3rd Generation Partnership Project, Valbonne, France (Aug. 22-26, 2011).

\* cited by examiner

Horizontal dimension antenna beam

US 10,128,928 B2

1

CHANNEL STATE INFORMATION CSI REPORTING METHOD AND APPARATUS, AND BASE STATION ANTENNA

CROSS-REFERENCE TO RELATED APPLICATION

This application is a continuation of International Patent Application No. PCT/CN2014/079010, filed on May 30, 2014, the disclosure of which is hereby incorporated by reference in its entirety.

TECHNICAL FIELD

The present invention relates to the field of mobile communications, and in particular, to a channel state information (CSI) reporting method and apparatus, and a base station antenna.

BACKGROUND

In a traditional multiple-input multiple-output (MIMO) communications system, a transmit antenna of a base station (e.g., evolved Node B or eNodeB) includes multiple antenna ports in a horizontal direction, and includes one antenna port in a vertical direction. Different antenna ports are corresponding to different antenna elements. An antenna beam is synthesized by using different weighting vectors on different antenna ports or antenna elements (because of the different weighting vectors on the different antenna ports or antenna elements, a transmit or receive signal forms an antenna beam in a specific direction or region, that is, signal energy is relatively high or signal quality is relatively high in the specific direction or region). When a width of the antenna beam is relatively narrow, a coverage area of the antenna beam is limited. For example, an antenna beam of a fixed downtilt is formed in the vertical direction. When a width of the antenna beam is relatively narrow, a coverage area of the antenna beam of the fixed downtilt is limited, and system performance loss is relatively large. Therefore, how to effectively improve the coverage area of the antenna beam becomes an urgent problem to be resolved.

SUMMARY

Based on the foregoing problem, embodiments of the present invention provide a channel state information CSI reporting method and apparatus, and a base station antenna.

According to a first aspect, a channel state information CSI reporting apparatus is provided, including:

a reference signal receiving unit, configured to receive a reference signal sent by a base station;

a precoding matrix selection unit, configured to select at least one precoding matrix from a codebook based on the reference signal received by the reference signal receiving unit, where the codebook includes a precoding matrix W, and W meets: $W = W_1 \otimes W_2$, where $\otimes$ is a Kronecker product, and at least one of $W_1$ or $W_2$ is an antenna selection matrix; and a CSI sending unit, configured to send CSI to the base station, where the CSI includes at least one precoding matrix indicator (PMI) selected by the precoding matrix selection unit, and the PMI is corresponding to the selected at least one precoding matrix.

With reference to the first aspect, in a first implementation manner, each reference signal is corresponding to one antenna port.

2

With reference to the first aspect, in a second implementation manner, in the antenna selection matrix, each column has at least one zero element.

With reference to the first aspect, in a third implementation manner, $W_1$ and $W_2$ are respectively corresponding to a horizontal dimension matrix vector and a vertical dimension matrix vector.

With reference to the first aspect, the first implementation manner of the first aspect, the second implementation manner of the first aspect, or the third implementation manner of the first aspect, in a fourth implementation manner, at least one of $W_1$ or $W_2$ is at least one of the following matrices:

$$a \begin{bmatrix} 1 \\ 0 \end{bmatrix} \text{ or } a \begin{bmatrix} 0 \\ 1 \end{bmatrix},$$

where a is a constant; or at least one of $W_1$ or $W_2$ is at least one of the following matrices:

$$b \begin{bmatrix} 1 \\ 0 \\ 0 \\ 0 \end{bmatrix}, b \begin{bmatrix} 0 \\ 1 \\ 0 \\ 0 \end{bmatrix}, b \begin{bmatrix} 0 \\ 0 \\ 1 \\ 0 \end{bmatrix}, \text{ or } b \begin{bmatrix} 0 \\ 0 \\ 0 \\ 1 \end{bmatrix},$$

where b is a constant; or at least one of $W_1$ or $W_2$ is at least one of the following matrices:

$$b_1 \begin{bmatrix} 1 \\ 0 \\ e^{j\theta} \\ 0 \end{bmatrix}, b_1 \begin{bmatrix} 0 \\ 1 \\ 0 \\ e^{j\theta} \end{bmatrix}, b_1 \begin{bmatrix} 1 \\ e^{j\theta} \\ 0 \\ 0 \end{bmatrix}, b_1 \begin{bmatrix} 0 \\ 0 \\ 1 \\ e^{j\theta} \end{bmatrix}, b_1 \begin{bmatrix} 1 \\ 0 \\ 0 \\ e^{j\theta} \end{bmatrix}, \text{ or } b_1 \begin{bmatrix} 0 \\ 1 \\ e^{j\theta} \\ 0 \end{bmatrix},$$

where $b_1$ is a constant, and $\theta \in [0, 2\pi]$; or at least one of $W_1$ or $W_2$ is at least one of the following matrices:

$$b_2 \begin{bmatrix} 1 \\ e^{j\theta_1} \\ e^{j\theta_2} \\ 0 \end{bmatrix}, b_2 \begin{bmatrix} 1 \\ 0 \\ e^{j\theta_1} \\ e^{j\theta_2} \end{bmatrix}, b_2 \begin{bmatrix} 1 \\ e^{j\theta_1} \\ 0 \\ e^{j\theta_2} \end{bmatrix}, \text{ or } b_2 \begin{bmatrix} 0 \\ 1 \\ e^{j\theta_1} \\ e^{j\theta_2} \end{bmatrix},$$

where $b_2$ is a constant, and $\theta_1, \theta_2 \in [0, 2\pi]$; or at least one of $W_1$ or $W_2$ is at least one of the following matrices:

$$c \begin{bmatrix} 1 \\ 0 \\ 0 \\ 0 \\ 0 \\ 0 \\ 0 \\ 0 \end{bmatrix}, c \begin{bmatrix} 0 \\ 1 \\ 0 \\ 0 \\ 0 \\ 0 \\ 0 \\ 0 \end{bmatrix}, c \begin{bmatrix} 0 \\ 0 \\ 1 \\ 0 \\ 0 \\ 0 \\ 0 \\ 0 \end{bmatrix}, c \begin{bmatrix} 0 \\ 0 \\ 0 \\ 1 \\ 0 \\ 0 \\ 0 \\ 0 \end{bmatrix}, c \begin{bmatrix} 0 \\ 0 \\ 0 \\ 0 \\ 1 \\ 0 \\ 0 \\ 0 \end{bmatrix}, c \begin{bmatrix} 0 \\ 0 \\ 0 \\ 0 \\ 0 \\ 1 \\ 0 \\ 0 \end{bmatrix}, c \begin{bmatrix} 0 \\ 0 \\ 0 \\ 0 \\ 0 \\ 0 \\ 1 \\ 0 \end{bmatrix}, \text{ or } c \begin{bmatrix} 0 \\ 0 \\ 0 \\ 0 \\ 0 \\ 0 \\ 0 \\ 1 \end{bmatrix}, or a quantity of non-zero elements in the matrix may be two, three, four, five, six, or seven, where c is a constant.

With reference to the first implementation manner of the first aspect, the second implementation manner of the first aspect, the third implementation manner of the first aspect, or the fourth implementation manner of the first aspect, in a fifth implementation manner, at least one of $W_1$ or $W_2$ is at least one of the following matrices:

$$a_2 \begin{bmatrix} 1 & 0 \\ 0 & e^{j\theta} \end{bmatrix},$$

where $a_2$ is a constant; or
at least one of $W_1$ or $W_2$ is at least one of the following matrices:

$$b_4 \begin{bmatrix} 1 & 1 \\ e^{j\theta} & -e^{j\theta} \\ 0 & 0 \\ 0 & 0 \end{bmatrix}, b_4 \begin{bmatrix} 0 & 0 \\ 0 & 0 \\ 1 & 1 \\ e^{j\theta} & -e^{j\theta} \end{bmatrix}, b_4 \begin{bmatrix} 1 & 1 \\ 0 & 0 \\ e^{j\theta} & -e^{j\theta} \\ 0 & 0 \end{bmatrix},$$

$$b_4 \begin{bmatrix} 1 & 1 \\ 0 & 0 \\ 0 & 0 \\ e^{j\theta} & -e^{j\theta} \end{bmatrix}, b_4 \begin{bmatrix} 0 & 0 \\ 1 & 1 \\ e^{j\theta} & -e^{j\theta} \\ 0 & 0 \end{bmatrix}, \text{ or } b_4 \begin{bmatrix} 0 & 0 \\ 1 & 1 \\ 0 & 0 \\ e^{j\theta} & -e^{j\theta} \end{bmatrix},$$

where $b_4$ is a constant, and $\theta \in [0, 2\pi]$; or
at least one of $W_1$ or $W_2$ is at least one of the following matrices:

$$b_5 \begin{bmatrix} 1 & 0 \\ 0 & 1 \\ 0 & 0 \\ 0 & 0 \end{bmatrix}, b_5 \begin{bmatrix} 1 & 0 \\ 0 & 0 \\ 0 & 1 \\ 0 & 0 \end{bmatrix}, b_5 \begin{bmatrix} 1 & 0 \\ 0 & 0 \\ 0 & 0 \\ 0 & 1 \end{bmatrix}, b_5 \begin{bmatrix} 0 & 0 \\ 1 & 0 \\ 0 & 1 \\ 0 & 0 \end{bmatrix},$$

$$b_5 \begin{bmatrix} 0 & 0 \\ 1 & 0 \\ 0 & 0 \\ 0 & 1 \end{bmatrix}, \text{ or } b_5 \begin{bmatrix} 0 & 0 \\ 0 & 0 \\ 1 & 0 \\ 0 & 1 \end{bmatrix},$$

where $b_5$ is a constant; or
at least one of $W_1$ or $W_2$ is at least one of the following matrices:

$$b_6 \begin{bmatrix} 1 & 0 \\ e^{j\theta} & 0 \\ 0 & 1 \\ 0 & 0 \end{bmatrix}, b_6 \begin{bmatrix} 1 & 0 \\ 0 & 0 \\ 0 & 1 \\ 0 & e^{j\theta} \end{bmatrix}, b_6 \begin{bmatrix} 1 & 0 \\ 0 & 1 \\ e^{j\theta} & 0 \\ 0 & 0 \end{bmatrix},$$

or $$b_6 \begin{bmatrix} 1 & 0 \\ 0 & 1 \\ 0 & 0 \\ 0 & e^{j\theta} \end{bmatrix},$$

where $b_6$ is a constant, and $\theta \in [0, 2\pi]$; or
at least one of $W_1$ or $W_2$ is at least one of the following matrices:

$$c_2 \begin{bmatrix} 1 & 0 \\ 0 & 1 \\ 0 & 0 \\ 0 & 0 \\ 0 & 0 \\ 0 & 0 \\ 0 & 0 \\ 0 & 0 \end{bmatrix}, c_2 \begin{bmatrix} 1 & 0 \\ 0 & 0 \\ 0 & 1 \\ 0 & 0 \\ 0 & 0 \\ 0 & 0 \\ 0 & 0 \\ 0 & 0 \end{bmatrix}, c_2 \begin{bmatrix} 1 & 0 \\ 0 & 0 \\ 0 & 0 \\ 0 & 1 \\ 0 & 0 \\ 0 & 0 \\ 0 & 0 \\ 0 & 0 \end{bmatrix}, c_2 \begin{bmatrix} 1 & 0 \\ 0 & 0 \\ 0 & 0 \\ 0 & 0 \\ 0 & 1 \\ 0 & 0 \\ 0 & 0 \\ 0 & 0 \end{bmatrix}, c_2 \begin{bmatrix} 1 & 0 \\ 0 & 0 \\ 0 & 0 \\ 0 & 0 \\ 0 & 0 \\ 0 & 1 \\ 0 & 0 \\ 0 & 0 \end{bmatrix}, c_2 \begin{bmatrix} 1 & 0 \\ 0 & 0 \\ 0 & 0 \\ 0 & 0 \\ 0 & 0 \\ 0 & 0 \\ 0 & 1 \\ 0 & 0 \end{bmatrix},$$

$$c_2 \begin{bmatrix} 1 & 0 \\ 0 & 0 \\ 0 & 0 \\ 0 & 0 \\ 0 & 0 \\ 0 & 0 \\ 0 & 0 \\ 0 & 1 \end{bmatrix}, c_2 \begin{bmatrix} 0 & 0 \\ 1 & 0 \\ 0 & 1 \\ 0 & 0 \\ 0 & 0 \\ 0 & 0 \\ 0 & 0 \\ 0 & 0 \end{bmatrix}, c_2 \begin{bmatrix} 0 & 0 \\ 1 & 0 \\ 0 & 0 \\ 0 & 1 \\ 0 & 0 \\ 0 & 0 \\ 0 & 0 \\ 0 & 0 \end{bmatrix}, c_2 \begin{bmatrix} 0 & 0 \\ 1 & 0 \\ 0 & 0 \\ 0 & 0 \\ 0 & 1 \\ 0 & 0 \\ 0 & 0 \\ 0 & 0 \end{bmatrix}, c_2 \begin{bmatrix} 0 & 0 \\ 1 & 0 \\ 0 & 0 \\ 0 & 0 \\ 0 & 0 \\ 0 & 1 \\ 0 & 0 \\ 0 & 0 \end{bmatrix}, c_2 \begin{bmatrix} 0 & 0 \\ 1 & 0 \\ 0 & 0 \\ 0 & 0 \\ 0 & 0 \\ 0 & 0 \\ 0 & 1 \\ 0 & 0 \end{bmatrix},$$

or $$c_2 \begin{bmatrix} 0 & 0 \\ 1 & 0 \\ 0 & 0 \\ 0 & 0 \\ 0 & 0 \\ 0 & 0 \\ 0 & 0 \\ 0 & 1 \end{bmatrix},$$

where $c_2$ is a constant.

With reference to the first aspect, the first implementation manner of the first aspect, the second implementation manner of the first aspect, the third implementation manner of the first aspect, the fourth implementation manner of the first aspect, or the fifth implementation manner of the first aspect, in a sixth implementation manner, the antenna selection matrix in $W_1$ and $W_2$ is used to select an antenna port for signal transmission.

With reference to the first implementation manner of the first aspect, the second implementation manner of the first aspect, the third implementation manner of the first aspect, the fourth implementation manner of the first aspect, the fifth implementation manner of the first aspect, or the sixth implementation manner of the first aspect, in a seventh implementation manner, the antenna port includes at least two antenna elements, and antenna element weighting vectors corresponding to at least two antenna ports are different.

With reference to the first implementation manner of the first aspect, the second implementation manner of the first aspect, the third implementation manner of the first aspect, the fourth implementation manner of the first aspect, the fifth implementation manner of the first aspect, the sixth implementation manner of the first aspect, or the seventh implementation manner of the first aspect, in an eighth implementation manner, at least two antenna ports are corresponding to a same group of antenna elements, and corresponding weighting vectors on the same group of antenna elements are different.

According to a second aspect, a channel state information CSI reporting apparatus is provided, including:
a processor, a memory, and a communications bus, where both the processor and the memory are connected to the communications bus, where:

the memory is connected to the processor, and stores program code executed by the processor; and the processor is connected to the memory, and is configured to: receive a reference signal sent by a base station; select at least one precoding matrix from a codebook based on the reference signal, where the codebook includes a precoding matrix W, and W meets: $W=W_1 \otimes W_2$, where $\otimes$ is a Kronecker product, and at least one of $W_1$ or $W_2$ is an antenna selection matrix; and send CSI to the base station, where the CSI includes at least one selected precoding matrix indicator PMI, and the PMI is corresponding to the selected at least one precoding matrix.

With reference to the second aspect, in a first implementation manner, each reference signal is corresponding to one antenna port.

With reference to the second aspect, in a second implementation manner, in the antenna selection matrix, each column has at least one zero element.

With reference to the second aspect, in a third implementation manner, $W_1$ and $W_2$ are respectively corresponding to a horizontal dimension matrix vector and a vertical dimension matrix vector.

With reference to the second aspect, the first implementation manner of the second aspect, the second implementation manner of the second aspect, or the third implementation manner of the second aspect, in a fourth implementation manner, at least one of $W_1$ or $W_2$ is at least one of the following matrices:

$$a\begin{bmatrix}1\\0\end{bmatrix}$$

or $$a\begin{bmatrix}0\\1\end{bmatrix},$$

where a is a constant; or at least one of $W_1$ or $W_2$ is at least one of the following matrices:

$$b\begin{bmatrix}1\\0\\0\\0\end{bmatrix}, b\begin{bmatrix}0\\1\\0\\0\end{bmatrix}, b\begin{bmatrix}0\\0\\1\\0\end{bmatrix},$$

or $$b\begin{bmatrix}0\\0\\0\\1\end{bmatrix},$$

where b is a constant; or at least one of $W_1$ or $W_2$ is at least one of the following matrices:

$$b_1\begin{bmatrix}1\\0\\e^{j\theta}\\0\end{bmatrix}, b_1\begin{bmatrix}0\\1\\0\\e^{j\theta}\end{bmatrix}, b_1\begin{bmatrix}1\\e^{j\theta}\\0\\0\end{bmatrix}, b_1\begin{bmatrix}0\\0\\1\\e^{j\theta}\end{bmatrix}, b_1\begin{bmatrix}1\\0\\0\\e^{j\theta}\end{bmatrix},$$

or $$b_1\begin{bmatrix}0\\1\\e^{j\theta}\\0\end{bmatrix},$$

where $b_1$ is a constant, and $\theta \in [0,2\pi]$; or at least one of $W_1$ or $W_2$ is at least one of the following matrices:

$$b_2\begin{bmatrix}1\\e^{j\theta_1}\\e^{j\theta_2}\\0\end{bmatrix}, b_2\begin{bmatrix}1\\0\\e^{j\theta_1}\\e^{j\theta_2}\end{bmatrix}, b_2\begin{bmatrix}1\\e^{j\theta_1}\\0\\e^{j\theta_2}\end{bmatrix},$$

or $$b_2\begin{bmatrix}0\\1\\e^{j\theta_1}\\e^{j\theta_2}\end{bmatrix},$$

where $b_2$ is a constant, and $\theta_1,\theta_2 \in [0,2\pi]$; or at least one of $W_1$ or $W_2$ is at least one of the following matrices:

$$c\begin{bmatrix}1\\0\\0\\0\\0\\0\\0\\0\end{bmatrix}, c\begin{bmatrix}0\\1\\0\\0\\0\\0\\0\\0\end{bmatrix}, c\begin{bmatrix}0\\0\\1\\0\\0\\0\\0\\0\end{bmatrix}, c\begin{bmatrix}0\\0\\0\\1\\0\\0\\0\\0\end{bmatrix}, c\begin{bmatrix}0\\0\\0\\0\\1\\0\\0\\0\end{bmatrix}, c\begin{bmatrix}0\\0\\0\\0\\0\\1\\0\\0\end{bmatrix}, c\begin{bmatrix}0\\0\\0\\0\\0\\0\\1\\0\end{bmatrix},$$

or $$c\begin{bmatrix}0\\0\\0\\0\\0\\0\\0\\1\end{bmatrix},$$

or a quantity of non-zero elements in the matrix may be two, three, four, five, six, or seven, where c is a constant.

With reference to the first implementation manner of the second aspect, the second implementation manner of the second aspect, the third implementation manner of the second aspect, or the fourth implementation manner of the second aspect, in a fifth implementation manner, at least one of $W_1$ or $W_2$ is at least one of the following matrices:

$$a_2 \begin{bmatrix} 1 & 0 \\ 0 & e^{j\theta} \end{bmatrix}$$

where $a_2$ is a constant; or
at least one of $W_1$ or $W_2$ is at least one of the following matrices:

$$b_4 \begin{bmatrix} 1 & 1 \\ e^{j\theta} & -e^{j\theta} \\ 0 & 0 \\ 0 & 0 \end{bmatrix}, b_4 \begin{bmatrix} 0 & 0 \\ 0 & 0 \\ 1 & 1 \\ e^{j\theta} & -e^{j\theta} \end{bmatrix}, b_4 \begin{bmatrix} 1 & 1 \\ 0 & 0 \\ e^{j\theta} & -e^{j\theta} \\ 0 & 0 \end{bmatrix},$$

$$b_4 \begin{bmatrix} 1 & 1 \\ 0 & 0 \\ 0 & 0 \\ e^{j\theta} & -e^{j\theta} \end{bmatrix}, b_4 \begin{bmatrix} 0 & 0 \\ 1 & 1 \\ e^{j\theta} & -e^{j\theta} \\ 0 & 0 \end{bmatrix},$$

or $$b_4 \begin{bmatrix} 0 & 0 \\ 1 & 1 \\ 0 & 0 \\ e^{j\theta} & -e^{j\theta} \end{bmatrix},$$

where $b_4$ is a constant, and $\theta \in [0, 2\pi]$; or
at least one of $W_1$ or $W_2$ is at least one of the following matrices:

$$b_5 \begin{bmatrix} 1 & 0 \\ 0 & 1 \\ 0 & 0 \\ 0 & 0 \end{bmatrix}, b_5 \begin{bmatrix} 1 & 0 \\ 0 & 0 \\ 0 & 1 \\ 0 & 0 \end{bmatrix}, b_5 \begin{bmatrix} 1 & 0 \\ 0 & 0 \\ 0 & 0 \\ 0 & 1 \end{bmatrix}, b_5 \begin{bmatrix} 0 & 0 \\ 1 & 0 \\ 0 & 1 \\ 0 & 0 \end{bmatrix}, b_5 \begin{bmatrix} 0 & 0 \\ 1 & 0 \\ 0 & 0 \\ 0 & 1 \end{bmatrix},$$

or $$b_5 \begin{bmatrix} 0 & 0 \\ 0 & 0 \\ 1 & 0 \\ 0 & 1 \end{bmatrix},$$

where $b_5$ is a constant; or
at least one of $W_1$ or $W_2$ is at least one of the following matrices:

$$b_6 \begin{bmatrix} 1 & 0 \\ e^{j\theta} & 0 \\ 0 & 1 \\ 0 & 0 \end{bmatrix}, b_6 \begin{bmatrix} 1 & 0 \\ 0 & 0 \\ 0 & 1 \\ 0 & e^{j\theta} \end{bmatrix}, b_6 \begin{bmatrix} 1 & 0 \\ 0 & 1 \\ e^{j\theta} & 0 \\ 0 & 0 \end{bmatrix},$$

or $$b_6 \begin{bmatrix} 1 & 0 \\ 0 & 1 \\ 0 & 0 \\ 0 & e^{j\theta} \end{bmatrix},$$

where $b_6$ is a constant, and $\theta \in [0, 2\pi]$; or
at least one of $W_1$ or $W_2$ is at least one of the following matrices:

$$c_2 \begin{bmatrix} 1 & 0 \\ 0 & 1 \\ 0 & 0 \\ 0 & 0 \\ 0 & 0 \\ 0 & 0 \\ 0 & 0 \\ 0 & 0 \end{bmatrix}, c_2 \begin{bmatrix} 1 & 0 \\ 0 & 0 \\ 0 & 1 \\ 0 & 0 \\ 0 & 0 \\ 0 & 0 \\ 0 & 0 \\ 0 & 0 \end{bmatrix}, c_2 \begin{bmatrix} 1 & 0 \\ 0 & 0 \\ 0 & 0 \\ 0 & 1 \\ 0 & 0 \\ 0 & 0 \\ 0 & 0 \\ 0 & 0 \end{bmatrix}, c_2 \begin{bmatrix} 1 & 0 \\ 0 & 0 \\ 0 & 0 \\ 0 & 0 \\ 0 & 1 \\ 0 & 0 \\ 0 & 0 \\ 0 & 0 \end{bmatrix}, c_2 \begin{bmatrix} 1 & 0 \\ 0 & 0 \\ 0 & 0 \\ 0 & 0 \\ 0 & 0 \\ 0 & 1 \\ 0 & 0 \\ 0 & 0 \end{bmatrix}, c_2 \begin{bmatrix} 1 & 0 \\ 0 & 0 \\ 0 & 0 \\ 0 & 0 \\ 0 & 0 \\ 0 & 0 \\ 0 & 1 \\ 0 & 0 \end{bmatrix},$$

$$c_2 \begin{bmatrix} 1 & 0 \\ 0 & 0 \\ 0 & 0 \\ 0 & 0 \\ 0 & 0 \\ 0 & 0 \\ 0 & 0 \\ 0 & 1 \end{bmatrix}, c_2 \begin{bmatrix} 0 & 0 \\ 0 & 0 \\ 1 & 0 \\ 0 & 1 \\ 0 & 0 \\ 0 & 0 \\ 0 & 0 \\ 0 & 0 \end{bmatrix}, c_2 \begin{bmatrix} 0 & 0 \\ 1 & 0 \\ 0 & 1 \\ 0 & 0 \\ 0 & 0 \\ 0 & 0 \\ 0 & 0 \\ 0 & 0 \end{bmatrix}, c_2 \begin{bmatrix} 0 & 0 \\ 1 & 0 \\ 0 & 0 \\ 0 & 1 \\ 0 & 0 \\ 0 & 0 \\ 0 & 0 \\ 0 & 0 \end{bmatrix}, c_2 \begin{bmatrix} 0 & 0 \\ 1 & 0 \\ 0 & 0 \\ 0 & 0 \\ 0 & 1 \\ 0 & 0 \\ 0 & 0 \\ 0 & 0 \end{bmatrix}, c_2 \begin{bmatrix} 0 & 0 \\ 1 & 0 \\ 0 & 0 \\ 0 & 0 \\ 0 & 0 \\ 0 & 1 \\ 0 & 0 \\ 0 & 0 \end{bmatrix}, c_2 \begin{bmatrix} 0 & 0 \\ 1 & 0 \\ 0 & 0 \\ 0 & 0 \\ 0 & 0 \\ 0 & 0 \\ 0 & 1 \\ 0 & 0 \end{bmatrix},$$

or $$c_2 \begin{bmatrix} 0 & 0 \\ 1 & 0 \\ 0 & 0 \\ 0 & 0 \\ 0 & 0 \\ 0 & 0 \\ 0 & 0 \\ 0 & 1 \end{bmatrix},$$

where $c_2$ is a constant.

With reference to the second aspect, the first implementation manner of the second aspect, the second implementation manner of the second aspect, the third implementation manner of the second aspect, the fourth implementation manner of the second aspect, or the fifth implementation manner of the second aspect, in a sixth implementation manner, the antenna selection matrix in $W_1$ and $W_2$ is used to select an antenna port for signal transmission.

With reference to the first implementation manner of the second aspect, the second implementation manner of the second aspect, the third implementation manner of the second aspect, the fourth implementation manner of the second aspect, the fifth implementation manner of the second aspect, or the sixth implementation manner of the second aspect, in a seventh implementation manner, the antenna port includes at least two antenna elements, and antenna element weighting vectors corresponding to at least two antenna ports are different.

With reference to the first implementation manner of the second aspect, the second implementation manner of the second aspect, the third implementation manner of the second aspect, the fourth implementation manner of the second aspect, the fifth implementation manner of the second aspect, the sixth implementation manner of the second aspect, or the seventh implementation manner of the second aspect, in an eighth implementation manner, at least two antenna ports are corresponding to a same group of antenna elements, and corresponding weighting vectors on the same group of antenna elements are different.

According to a third aspect, a channel state information CSI reporting method is provided, including:

receiving a reference signal sent by a base station;
selecting at least one precoding matrix from a codebook based on the reference signal, where the codebook includes a precoding matrix W, and W meets:

$W = W_1 \otimes W_2$, where $\otimes$ is a Kronecker product, and at least one of $W_1$ or $W_2$ is an antenna selection matrix; and sending CSI to the base station, where the CSI includes selected at least one precoding matrix indicator PMI, and the PMI is corresponding to the selected at least one precoding matrix.

With reference to the third aspect, in a first implementation manner, each reference signal is corresponding to one antenna port.

With reference to the third aspect, in a second implementation manner, in the antenna selection matrix, each column has at least one zero element.

With reference to the third aspect, in a third implementation manner, $W_1$ and $W_2$ are respectively corresponding to a horizontal dimension matrix vector and a vertical dimension matrix vector.

With reference to the third aspect, the first implementation manner of the third aspect, the second implementation manner of the third aspect, or the third implementation manner of the third aspect, in a fourth implementation manner, at least one of $W_1$ or $W_2$ is at least one of the following matrices:

$$a\begin{bmatrix}1\\0\end{bmatrix}$$

or $$a\begin{bmatrix}0\\1\end{bmatrix},$$

where $a$ is a constant; or at least one of $W_1$ or $W_2$ is at least one of the following matrices:

$$b\begin{bmatrix}1\\0\\0\\0\end{bmatrix}, b\begin{bmatrix}0\\1\\0\\0\end{bmatrix}, b\begin{bmatrix}0\\0\\1\\0\end{bmatrix},$$

or $$b\begin{bmatrix}0\\0\\0\\1\end{bmatrix},$$

where $b$ is a constant; or at least one of $W_1$ or $W_2$ is at least one of the following matrices:

$$b_1\begin{bmatrix}1\\0\\e^{j\theta}\\0\end{bmatrix}, b_1\begin{bmatrix}0\\1\\0\\e^{j\theta}\end{bmatrix}, b_1\begin{bmatrix}1\\e^{j\theta}\\0\\0\end{bmatrix}, b_1\begin{bmatrix}0\\0\\1\\e^{j\theta}\end{bmatrix}, b_1\begin{bmatrix}1\\0\\0\\e^{j\theta}\end{bmatrix},$$

or $$b_1\begin{bmatrix}0\\1\\0\\e^{j\theta}\end{bmatrix},$$

where $b_1$ is a constant, and $\theta \in [0, 2\pi]$; or at least one of $W_1$ or $W_2$ is at least one of the following matrices:

$$b_2\begin{bmatrix}1\\e^{j\theta_1}\\e^{j\theta_2}\\0\end{bmatrix}, b_2\begin{bmatrix}1\\0\\e^{j\theta_1}\\e^{j\theta_2}\end{bmatrix}, b_2\begin{bmatrix}1\\e^{j\theta_1}\\0\\e^{j\theta_2}\end{bmatrix},$$

or $$b_2\begin{bmatrix}0\\1\\e^{j\theta_1}\\e^{j\theta_2}\end{bmatrix},$$

where $b_2$ is a constant, and $\theta_1, \theta_2 \in [0, 2\pi]$; or at least one of $W_1$ or $W_2$ is at least one of the following matrices:

$$c\begin{bmatrix}1\\0\\0\\0\\0\\0\\0\\0\end{bmatrix}, c\begin{bmatrix}0\\1\\0\\0\\0\\0\\0\\0\end{bmatrix}, c\begin{bmatrix}0\\0\\1\\0\\0\\0\\0\\0\end{bmatrix}, c\begin{bmatrix}0\\0\\0\\1\\0\\0\\0\\0\end{bmatrix}, c\begin{bmatrix}0\\0\\0\\0\\1\\0\\0\\0\end{bmatrix}, c\begin{bmatrix}0\\0\\0\\0\\0\\1\\0\\0\end{bmatrix}, c\begin{bmatrix}0\\0\\0\\0\\0\\0\\1\\0\end{bmatrix},$$

or $$c\begin{bmatrix}0\\0\\0\\0\\0\\0\\0\\1\end{bmatrix},$$

or a quantity of non-zero elements in the matrix may be two, three, four, five, six, or seven, where $c$ is a constant.

With reference to the first implementation manner of the third aspect, the second implementation manner of the third aspect, the third implementation manner of the third aspect, or the fourth implementation manner of the third aspect, in a fifth implementation manner, at least one of $W_1$ or $W_2$ is at least one of the following matrices:

$$a_2\begin{bmatrix}1 & 0\\0 & e^{j\theta}\end{bmatrix},$$

where $a_2$ is a constant; or at least one of $W_1$ or $W_2$ is at least one of the following matrices:

$$b_4\begin{bmatrix}1 & 1\\e^{j\theta} & -e^{j\theta}\\0 & 0\\0 & 0\end{bmatrix}, b_4\begin{bmatrix}0 & 0\\0 & 0\\1 & 1\\e^{j\theta} & -e^{j\theta}\end{bmatrix}, b_4\begin{bmatrix}1 & 1\\0 & 0\\e^{j\theta} & -e^{j\theta}\\0 & 0\end{bmatrix}, b_4\begin{bmatrix}1 & 1\\0 & 0\\0 & 0\\e^{j\theta} & -e^{j\theta}\end{bmatrix},$$

$$b_4\begin{bmatrix}0 & 0\\1 & 1\\e^{j\theta} & -e^{j\theta}\\0 & 0\end{bmatrix},$$

or $$b_4\begin{bmatrix}0 & 0\\1 & 1\\0 & 0\\e^{j\theta} & -e^{j\theta}\end{bmatrix},$$

where $b_4$ is a constant, and $\theta \in [0, 2\pi]$; or at least one of $W_1$ or $W_2$ is at least one of the following matrices:

$$b_5 \begin{bmatrix} 1 & 0 \\ 0 & 1 \\ 0 & 0 \\ 0 & 0 \end{bmatrix}, b_5 \begin{bmatrix} 1 & 0 \\ 0 & 0 \\ 0 & 1 \\ 0 & 0 \end{bmatrix}, b_5 \begin{bmatrix} 1 & 0 \\ 0 & 0 \\ 0 & 0 \\ 0 & 1 \end{bmatrix}, b_5 \begin{bmatrix} 0 & 0 \\ 1 & 0 \\ 0 & 1 \\ 0 & 0 \end{bmatrix}, b_5 \begin{bmatrix} 0 & 0 \\ 1 & 0 \\ 0 & 0 \\ 0 & 1 \end{bmatrix}, \text{ or } b_5 \begin{bmatrix} 0 & 0 \\ 0 & 0 \\ 1 & 0 \\ 0 & 1 \end{bmatrix},$$

where $b_5$ is a constant; or at least one of $W_1$ or $W_2$ is at least one of the following matrices:

$$b_6 \begin{bmatrix} 1 & 0 \\ e^{j\theta} & 0 \\ 0 & 1 \\ 0 & 0 \end{bmatrix}, b_6 \begin{bmatrix} 1 & 0 \\ 0 & 0 \\ 0 & 1 \\ 0 & e^{j\theta} \end{bmatrix}, b_6 \begin{bmatrix} 1 & 0 \\ 0 & 1 \\ e^{j\theta} & 0 \\ 0 & 0 \end{bmatrix}, \text{ or } b_6 \begin{bmatrix} 1 & 0 \\ 0 & 1 \\ 0 & 0 \\ 0 & e^{j\theta} \end{bmatrix},$$

where $b_6$ is a constant, and $\theta \in [0, 2\pi]$; or at least one of $W_1$ or $W_2$ is at least one of the following matrices:

$$c_2 \begin{bmatrix} 1 & 0 \\ 0 & 1 \\ 0 & 0 \\ 0 & 0 \\ 0 & 0 \\ 0 & 0 \\ 0 & 0 \\ 0 & 0 \end{bmatrix}, c_2 \begin{bmatrix} 1 & 0 \\ 0 & 0 \\ 0 & 1 \\ 0 & 0 \\ 0 & 0 \\ 0 & 0 \\ 0 & 0 \\ 0 & 0 \end{bmatrix}, c_2 \begin{bmatrix} 1 & 0 \\ 0 & 0 \\ 0 & 0 \\ 0 & 1 \\ 0 & 0 \\ 0 & 0 \\ 0 & 0 \\ 0 & 0 \end{bmatrix}, c_2 \begin{bmatrix} 1 & 0 \\ 0 & 0 \\ 0 & 0 \\ 0 & 0 \\ 0 & 1 \\ 0 & 0 \\ 0 & 0 \\ 0 & 0 \end{bmatrix}, c_2 \begin{bmatrix} 1 & 0 \\ 0 & 0 \\ 0 & 0 \\ 0 & 0 \\ 0 & 0 \\ 0 & 1 \\ 0 & 0 \\ 0 & 0 \end{bmatrix}, c_2 \begin{bmatrix} 1 & 0 \\ 0 & 0 \\ 0 & 0 \\ 0 & 0 \\ 0 & 0 \\ 0 & 0 \\ 0 & 1 \\ 0 & 0 \end{bmatrix},$$

$$c_2 \begin{bmatrix} 1 & 0 \\ 0 & 0 \\ 0 & 0 \\ 0 & 0 \\ 0 & 0 \\ 0 & 0 \\ 0 & 0 \\ 0 & 1 \end{bmatrix}, c_2 \begin{bmatrix} 0 & 0 \\ 1 & 0 \\ 0 & 1 \\ 0 & 0 \\ 0 & 0 \\ 0 & 0 \\ 0 & 0 \\ 0 & 0 \end{bmatrix}, c_2 \begin{bmatrix} 0 & 0 \\ 1 & 0 \\ 0 & 0 \\ 0 & 1 \\ 0 & 0 \\ 0 & 0 \\ 0 & 0 \\ 0 & 0 \end{bmatrix}, c_2 \begin{bmatrix} 0 & 0 \\ 1 & 0 \\ 0 & 0 \\ 0 & 0 \\ 0 & 1 \\ 0 & 0 \\ 0 & 0 \\ 0 & 0 \end{bmatrix}, c_2 \begin{bmatrix} 0 & 0 \\ 1 & 0 \\ 0 & 0 \\ 0 & 0 \\ 0 & 0 \\ 0 & 1 \\ 0 & 0 \\ 0 & 0 \end{bmatrix}, c_2 \begin{bmatrix} 0 & 0 \\ 1 & 0 \\ 0 & 0 \\ 0 & 0 \\ 0 & 0 \\ 0 & 0 \\ 0 & 1 \\ 0 & 0 \end{bmatrix},$$

$$\text{or } c_2 \begin{bmatrix} 0 & 0 \\ 1 & 0 \\ 0 & 0 \\ 0 & 0 \\ 0 & 0 \\ 0 & 0 \\ 0 & 0 \\ 0 & 1 \end{bmatrix},$$

where $c_2$ is a constant.

With reference to the third aspect, the first implementation manner of the third aspect, the second implementation manner of the third aspect, the third implementation manner of the third aspect, the fourth implementation manner of the third aspect, or the fifth implementation manner of the third aspect, in a sixth implementation manner, the antenna selection matrix in $W_1$ and $W_2$ is used to select an antenna port for signal transmission.

With reference to the first implementation manner of the third aspect, the second implementation manner of the third aspect, the third implementation manner of the third aspect, the fourth implementation manner of the third aspect, the fifth implementation manner of the third aspect, or the sixth implementation manner of the third aspect, in a seventh implementation manner, the antenna port includes at least two antenna elements, and antenna element weighting vectors corresponding to at least two antenna ports are different.

With reference to the first implementation manner of the third aspect, the second implementation manner of the third aspect, the third implementation manner of the third aspect, the fourth implementation manner of the third aspect, the fifth implementation manner of the third aspect, the sixth implementation manner of the third aspect, or the seventh implementation manner of the third aspect, in an eighth implementation manner, at least two antenna ports are corresponding to a same group of antenna elements, and corresponding weighting vectors on the same group of antenna elements are different.

According to a fourth aspect, a base station antenna is provided, including:

at least one antenna unit, where the antenna unit includes: a drive network selection module, at least two drive networks, and at least one antenna element group, each antenna element group includes at least two antenna elements, and antenna element weighting vectors corresponding to the drive networks are different from each other, where:

the drive network selection module is connected to each drive network, and is configured to select one drive network from the at least two drive networks, so that a transmit signal is transmitted to the selected drive network;

the drive network is connected to each antenna element in any antenna element group, and is configured to: perform phase shifting on the transmit signal, and transmit a transmit signal obtained after the phase shifting to each connected antenna element in the antenna element group; and the antenna element group is configured to send the transmit signal obtained after the phase shifting.

With reference to the fourth aspect, in a first implementation manner, each antenna element group is corresponding to at least two drive networks.

With reference to the fourth aspect or the first implementation manner of the fourth aspect, in a second implementation manner, the antenna unit further includes:

signal combiners in a one-to-one correspondence with the antenna elements in each antenna element group, where:

each signal combiner is disposed at transmit signal output ends of drive networks corresponding to each antenna element, and is configured to: combine transmit signals obtained after phase shifting performed by the drive networks, and then send a combined transmit signal to the corresponding antenna element.

With reference to the fourth aspect, the first implementation manner of the fourth aspect, or the second implementation manner of the fourth aspect, in a third implementation manner, the antenna unit further includes:

power amplifiers in a one-to-one correspondence with the drive networks, where:

each power amplifier is disposed before a corresponding drive network, and is configured to: perform power amplification on the transmit signal, and then send the transmit signal obtained after the power amplification to the corresponding drive network.

With reference to the fourth aspect, the first implementation manner of the fourth aspect, or the second implementation manner of the fourth aspect, in a fourth implementation manner, the antenna unit further includes:

power amplifiers in a one-to-one correspondence with the antenna elements in each antenna element group, where:

each power amplifier is disposed between each antenna element and transmit signal output ends of drive networks corresponding to the antenna element, and is configured to: perform power amplification on transmit signals obtained after the phase shifting performed by the drive networks, and then send the transmit signals obtained after the power amplification to the corresponding antenna element.

In the technical solutions of the embodiments of the present invention, at least one precoding matrix is selected from a codebook based on a reference signal sent by a base station, and CSI is sent to the base station. The CSI includes at least one selected precoding matrix indicator PMI, and the PMI is corresponding to the selected at least one precoding matrix. At least one precoding matrix W included in the codebook may be expressed as $W=W_1 \otimes W_2$, where $\otimes$ is a Kronecker product, and at least one of $W_1$ or $W_2$ is an antenna selection matrix. Therefore, in the embodiments of the present invention, the base station can select, according to the at least one precoding matrix that is fed back, one or more antenna ports to send a signal. Each antenna port is corresponding to one antenna element phase weighting vector. A different antenna element phase weighting vector is selected by selecting a different antenna port, so that an antenna beam is changed, which can effectively improve an antenna beam coverage status.

DESCRIPTION OF EMBODIMENTS

For a prior-art problem of a limited coverage area of an antenna beam, embodiments of the present invention provide a channel state information CSI reporting method and apparatus, and a base station antenna. In the technical solutions, at least one precoding matrix is selected from a codebook based on a reference signal sent by a base station, and CSI is sent to the base station. The CSI includes at least one selected precoding matrix indicator PMI, and the PMI is corresponding to the selected at least one precoding matrix. At least one precoding matrix W included in the codebook may be expressed as $W=W_1 \otimes W_2$, where $\otimes$ is a Kronecker product, and at least one of $W_1$ or $W_2$ is an antenna selection matrix. Therefore, in the embodiments of the present invention, the base station can select, according to the at least one precoding matrix that is fed back, one or more antenna ports to send a signal. Each antenna port is corresponding to one antenna element phase weighting vector. A different antenna element phase weighting vector is selected by selecting a different antenna port, so that an antenna beam is changed, which can effectively improve an antenna beam coverage status.

The following describes a main implementation principle, specific implementation manners, and corresponding beneficial effects of the technical solutions of the embodiments of the present invention in detail with reference to the accompanying drawings of the specification.

The CSI reporting solutions provided in the embodiments of the present invention are implemented mainly by selecting a precoding matrix, to improve the antenna beam coverage status.

Figure 1:
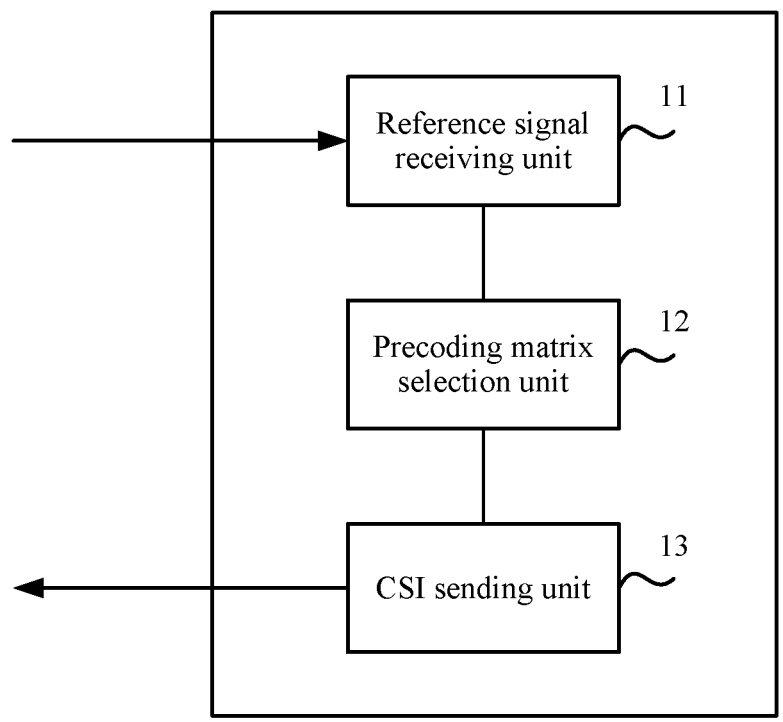
FIG. 1 is a schematic structural diagram of a CSI reporting apparatus according to an embodiment of the present invention.

As shown in FIG. 1, FIG. 1 is a schematic structural diagram of a CSI reporting apparatus according to an embodiment of the present invention. The CSI reporting apparatus includes:

a reference signal receiving unit 11, configured to receive a reference signal sent by a base station;

a precoding matrix selection unit 12, configured to select at least one precoding matrix from a codebook based on the reference signal received by the reference signal receiving unit 11, where the codebook includes a precoding matrix W, and W meets: $W=W_1 \otimes W_2$, where $\otimes$ is a Kronecker product, and at least one of $W_1$ or $W_2$ is an antenna selection matrix; and a CSI sending unit 13, configured to send CSI to the base station, where the CSI includes at least one precoding matrix indicator PMI selected by the precoding matrix selection unit 12, and the PMI is corresponding to the selected at least one precoding matrix.

Optionally, each reference signal is corresponding to one antenna port.

Optionally, in the antenna selection matrix, each column has at least one zero element.

Optionally, $W_1$ and $W_2$ are respectively corresponding to a horizontal dimension matrix vector and a vertical dimension matrix vector.

Optionally, at least one of $W_1$ or $W_2$ is at least one of the following matrices:

$$a\begin{bmatrix}1\\0\end{bmatrix} \text{ or } a\begin{bmatrix}0\\1\end{bmatrix},$$

where a is a constant; or at least one of $W_1$ or $W_2$ is at least one of the following matrices:

$$b\begin{bmatrix}1\\0\\0\\0\end{bmatrix}, b\begin{bmatrix}0\\1\\0\\0\end{bmatrix}, b\begin{bmatrix}0\\0\\1\\0\end{bmatrix}, \text{ or } b\begin{bmatrix}0\\0\\0\\1\end{bmatrix},$$

where b is a constant; or at least one of $W_1$ or $W_2$ is at least one of the following matrices:

$$b_1\begin{bmatrix}1\\0\\e^{j\theta}\\0\end{bmatrix}, b_1\begin{bmatrix}0\\1\\0\\e^{j\theta}\end{bmatrix}, b_1\begin{bmatrix}1\\e^{j\theta}\\0\\0\end{bmatrix}, b_1\begin{bmatrix}0\\0\\1\\e^{j\theta}\end{bmatrix}, b_1\begin{bmatrix}1\\0\\0\\e^{j\theta}\end{bmatrix}, \text{ or } b_1\begin{bmatrix}0\\1\\e^{j\theta}\\0\end{bmatrix},$$

where $b_1$ is a constant, and $\theta \in [0, 2\pi]$; or at least one of $W_1$ or $W_2$ is at least one of the following matrices:

$$b_2\begin{bmatrix}1\\e^{j\theta_1}\\e^{j\theta_2}\\0\end{bmatrix}, b_2\begin{bmatrix}1\\0\\e^{j\theta_1}\\e^{j\theta_2}\end{bmatrix}, b_2\begin{bmatrix}1\\e^{j\theta_1}\\0\\e^{j\theta_2}\end{bmatrix}, \text{ or } b_2\begin{bmatrix}0\\1\\e^{j\theta_1}\\e^{j\theta_2}\end{bmatrix},$$

where $b_2$ is a constant, and $\theta_1, \theta_2 \in [0, 2\pi]$; or at least one of $W_1$ or $W_2$ is at least one of the following matrices:

$$c\begin{bmatrix}1\\0\\0\\0\\0\\0\\0\\0\end{bmatrix}, c\begin{bmatrix}0\\1\\0\\0\\0\\0\\0\\0\end{bmatrix}, c\begin{bmatrix}0\\0\\1\\0\\0\\0\\0\\0\end{bmatrix}, c\begin{bmatrix}0\\0\\0\\1\\0\\0\\0\\0\end{bmatrix}, c\begin{bmatrix}0\\0\\0\\0\\1\\0\\0\\0\end{bmatrix}, c\begin{bmatrix}0\\0\\0\\0\\0\\1\\0\\0\end{bmatrix}, c\begin{bmatrix}0\\0\\0\\0\\0\\0\\1\\0\end{bmatrix}, \text{ or } c\begin{bmatrix}0\\0\\0\\0\\0\\0\\0\\1\end{bmatrix},$$

or a quantity of non-zero elements in the matrix may be two, three, four, five, six, or seven, where c is a constant.

Optionally, at least one of $W_1$ or $W_2$ is at least one of the following matrices:

$$a_2\begin{bmatrix}1 & 0\\0 & e^{j\theta}\end{bmatrix},$$

where $a_2$ is a constant; or at least one of $W_1$ or $W_2$ is at least one of the following matrices:

$$b_4\begin{bmatrix}1 & 1\\e^{j\theta} & -e^{j\theta}\\0 & 0\\0 & 0\end{bmatrix}, b_4\begin{bmatrix}0 & 0\\0 & 0\\1 & 1\\e^{j\theta} & -e^{j\theta}\end{bmatrix}, b_4\begin{bmatrix}1 & 1\\0 & 0\\e^{j\theta} & -e^{j\theta}\\0 & 0\end{bmatrix}, b_4\begin{bmatrix}1 & 1\\0 & 0\\0 & 0\\e^{j\theta} & -e^{j\theta}\end{bmatrix},$$

$$b_4\begin{bmatrix}0 & 0\\1 & 1\\e^{j\theta} & -e^{j\theta}\\0 & 0\end{bmatrix}, \text{ or } b_4\begin{bmatrix}0 & 0\\1 & 1\\0 & 0\\e^{j\theta} & -e^{j\theta}\end{bmatrix},$$

where $b_4$ is a constant, and $\theta \in [0, 2\pi]$; or at least one of $W_1$ or $W_2$ is at least one of the following matrices:

$$b_5\begin{bmatrix}1 & 0\\0 & 1\\0 & 0\\0 & 0\end{bmatrix}, b_5\begin{bmatrix}1 & 0\\0 & 0\\0 & 1\\0 & 0\end{bmatrix}, b_5\begin{bmatrix}1 & 0\\0 & 0\\0 & 0\\0 & 1\end{bmatrix}, b_5\begin{bmatrix}0 & 0\\1 & 0\\0 & 1\\0 & 0\end{bmatrix}, b_5\begin{bmatrix}0 & 0\\1 & 0\\0 & 0\\0 & 1\end{bmatrix}, \text{ or } b_5\begin{bmatrix}0 & 0\\0 & 0\\1 & 0\\0 & 1\end{bmatrix},$$

where $b_5$ is a constant; or at least one of $W_1$ or $W_2$ is at least one of the following matrices:

$$b_6\begin{bmatrix}1 & 0\\e^{j\theta} & 0\\0 & 1\\0 & 0\end{bmatrix}, b_6\begin{bmatrix}1 & 0\\0 & 0\\0 & 1\\0 & e^{j\theta}\end{bmatrix}, b_6\begin{bmatrix}1 & 0\\0 & 1\\e^{j\theta} & 0\\0 & 0\end{bmatrix}, \text{ or } b_6\begin{bmatrix}1 & 0\\0 & 1\\0 & 0\\0 & e^{j\theta}\end{bmatrix},$$

where $b_6$ is a constant, and $\theta \in [0, 2\pi]$; or at least one of $W_1$ or $W_2$ is at least one of the following matrices:

$$c_2\begin{bmatrix}1 & 0\\0 & 1\\0 & 0\\0 & 0\\0 & 0\\0 & 0\\0 & 0\\0 & 0\end{bmatrix}, c_2\begin{bmatrix}1 & 0\\0 & 0\\0 & 1\\0 & 0\\0 & 0\\0 & 0\\0 & 0\\0 & 0\end{bmatrix}, c_2\begin{bmatrix}1 & 0\\0 & 0\\0 & 0\\0 & 1\\0 & 0\\0 & 0\\0 & 0\\0 & 0\end{bmatrix}, c_2\begin{bmatrix}1 & 0\\0 & 0\\0 & 0\\0 & 0\\0 & 1\\0 & 0\\0 & 0\\0 & 0\end{bmatrix}, c_2\begin{bmatrix}1 & 0\\0 & 0\\0 & 0\\0 & 0\\0 & 0\\0 & 1\\0 & 0\\0 & 0\end{bmatrix},$$

$$c_2\begin{bmatrix}1 & 0\\0 & 0\\0 & 0\\0 & 0\\0 & 0\\0 & 0\\0 & 1\\0 & 0\end{bmatrix}, c_2\begin{bmatrix}1 & 0\\0 & 0\\0 & 0\\0 & 0\\0 & 0\\0 & 0\\0 & 0\\0 & 1\end{bmatrix}, c_2\begin{bmatrix}0 & 0\\1 & 0\\0 & 1\\0 & 0\\0 & 0\\0 & 0\\0 & 0\\0 & 0\end{bmatrix}, c_2\begin{bmatrix}0 & 0\\1 & 0\\0 & 0\\0 & 1\\0 & 0\\0 & 0\\0 & 0\\0 & 0\end{bmatrix}, c_2\begin{bmatrix}0 & 0\\1 & 0\\0 & 0\\0 & 0\\0 & 1\\0 & 0\\0 & 0\\0 & 0\end{bmatrix},$$

-continued $$c_2\begin{bmatrix}0&0\\1&0\\0&0\\0&0\\0&0\\0&1\\0&0\\0&0\end{bmatrix}, c_2\begin{bmatrix}0&0\\1&0\\0&0\\0&0\\0&0\\0&0\\0&1\\0&0\end{bmatrix}, \text{ or } c_2\begin{bmatrix}0&0\\1&0\\0&0\\0&0\\0&0\\0&0\\0&0\\0&1\end{bmatrix},$$

where $c_2$ is a constant.

Optionally, the antenna selection matrix in $W_1$ and $W_2$ is used to select an antenna port for signal transmission.

Optionally, the antenna port includes at least two antenna elements, and antenna element weighting vectors corresponding to at least two antenna ports are different.

Optionally, at least two antenna ports are corresponding to a same group of antenna elements, and corresponding weighting vectors on the same group of antenna elements are different.

Figure 2:
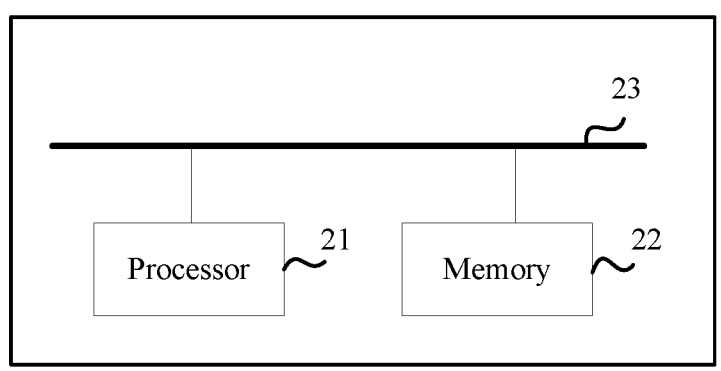
FIG. 2 is a hardware structure diagram of a CSI reporting apparatus according to an embodiment of the present invention.

Based on the foregoing provided apparatus, as shown in FIG. 2, FIG. 2 is a hardware structure diagram of the apparatus according to an embodiment of the present invention, and the apparatus includes: a processor 21, a memory 22, and a communications bus 23. Both the processor 21 and the memory 22 are connected to the communications bus 23.

The processor 21 may be a general-purpose central processing unit (CPU), a microprocessor, an application-specific integrated circuit (ASIC), or one or more integrated circuits for controlling execution of a program of the solutions of the present invention.

The communications bus 23 may include a path for transferring information between the foregoing components.

The memory 22 is connected to the processor 21, and stores program code executed by the processor 21.

The processor 21 is connected to the memory 22, and is configured to: receive a reference signal sent by a base station; select at least one precoding matrix from a codebook based on the reference signal, where the codebook includes a precoding matrix W, and W meets: $W = W_1 \otimes W_2$, where $\otimes$ is a Kronecker product, and at least one of $W_1$ or $W_2$ is an antenna selection matrix; and send CSI to the base station, where the CSI includes at least one selected precoding matrix indicator PMI, and the PMI is corresponding to the selected at least one precoding matrix.

Optionally, each reference signal is corresponding to one antenna port.

Optionally, in the antenna selection matrix, each column has at least one zero element.

Optionally, $W_1$ and $W_2$ are respectively corresponding to a horizontal dimension matrix vector and a vertical dimension matrix vector.

Optionally, at least one of $W_1$ or $W_2$ is at least one of the following matrices:

$$a\begin{bmatrix}1\\0\end{bmatrix} \text{ or } a\begin{bmatrix}0\\1\end{bmatrix},$$

where $a$ is a constant; or
at least one of $W_1$ or $W_2$ is at least one of the following matrices:

$$b\begin{bmatrix}1\\0\\0\\0\end{bmatrix}, b\begin{bmatrix}0\\1\\0\\0\end{bmatrix}, b\begin{bmatrix}0\\0\\1\\0\end{bmatrix}, \text{ or } b\begin{bmatrix}0\\0\\0\\1\end{bmatrix},$$

where $b$ is a constant; or
at least one of $W_1$ or $W_2$ is at least one of the following matrices:

$$b_1\begin{bmatrix}1\\0\\e^{j\theta}\\0\end{bmatrix}, b_1\begin{bmatrix}0\\1\\0\\e^{j\theta}\end{bmatrix}, b_1\begin{bmatrix}1\\e^{j\theta}\\0\\0\end{bmatrix}, b_1\begin{bmatrix}0\\0\\1\\e^{j\theta}\end{bmatrix}, b_1\begin{bmatrix}1\\0\\0\\e^{j\theta}\end{bmatrix}, \text{ or } b_1\begin{bmatrix}0\\1\\e^{j\theta}\\0\end{bmatrix},$$

where $b_1$ is a constant, and $\theta \in [0, 2\pi]$; or
at least one of $W_1$ or $W_2$ is at least one of the following matrices:

$$b_2\begin{bmatrix}1\\e^{j\theta_1}\\e^{j\theta_2}\\0\end{bmatrix}, b_2\begin{bmatrix}1\\0\\e^{j\theta_1}\\e^{j\theta_2}\end{bmatrix}, b_2\begin{bmatrix}1\\e^{j\theta_1}\\0\\e^{j\theta_2}\end{bmatrix}, \text{ or } b_2\begin{bmatrix}0\\1\\e^{j\theta_1}\\e^{j\theta_2}\end{bmatrix},$$

where $b_2$ is a constant, and $\theta_1, \theta_2 \in [0, 2\pi]$; or
at least one of $W_1$ or $W_2$ is at lease one of the following matrices:

$$c\begin{bmatrix}1\\0\\0\\0\\0\\0\\0\\0\end{bmatrix}, c\begin{bmatrix}0\\1\\0\\0\\0\\0\\0\\0\end{bmatrix}, c\begin{bmatrix}0\\0\\1\\0\\0\\0\\0\\0\end{bmatrix}, c\begin{bmatrix}0\\0\\0\\1\\0\\0\\0\\0\end{bmatrix}, c\begin{bmatrix}0\\0\\0\\0\\1\\0\\0\\0\end{bmatrix}, c\begin{bmatrix}0\\0\\0\\0\\0\\1\\0\\0\end{bmatrix}, c\begin{bmatrix}0\\0\\0\\0\\0\\0\\1\\0\end{bmatrix}, \text{ or } c\begin{bmatrix}0\\0\\0\\0\\0\\0\\0\\1\end{bmatrix},$$

or a quantity of non-zero elements in the matrix may be two, three, four, five, six, or seven, where $c$ is a constant.

Optionally, at least one of $W_1$ or $W_2$ is at least one of the following matrices:

$$a_2\begin{bmatrix}1&0\\0&e^{j\theta}\end{bmatrix},$$

where $a_2$ is a constant; or
at least one of $W_1$ or $W_2$ is at least one of the following matrices:

$$b_4\begin{bmatrix}1&1\\e^{j\theta}&-e^{j\theta}\\0&0\\0&0\end{bmatrix}, b_4\begin{bmatrix}0&0\\0&0\\1&1\\e^{j\theta}&-e^{j\theta}\end{bmatrix}, b_4\begin{bmatrix}1&1\\0&0\\e^{j\theta}&-e^{j\theta}\\0&0\end{bmatrix},$$

$$b_4\begin{bmatrix}1&1\\0&0\\0&0\\e^{j\theta}&-e^{j\theta}\end{bmatrix}, b_4\begin{bmatrix}0&0\\1&1\\e^{j\theta}&-e^{j\theta}\\0&0\end{bmatrix}, \text{ or } b_4\begin{bmatrix}0&0\\1&1\\0&0\\e^{j\theta}&-e^{j\theta}\end{bmatrix},$$

where $b_4$ is a constant, and $\theta\in[0,2\pi]$; or at least one of $W_1$ or $W_2$ is at least one of the following matrices:

$$b_5\begin{bmatrix}1&0\\0&1\\0&0\\0&0\end{bmatrix}, b_5\begin{bmatrix}1&0\\0&0\\0&1\\0&0\end{bmatrix}, b_5\begin{bmatrix}1&0\\0&0\\0&0\\0&1\end{bmatrix}, b_5\begin{bmatrix}0&0\\1&0\\0&1\\0&0\end{bmatrix}, b_5\begin{bmatrix}0&0\\1&0\\0&0\\0&1\end{bmatrix}, \text{ or}$$

$$b_5\begin{bmatrix}0&0\\0&0\\1&0\\0&1\end{bmatrix},$$

where $b_5$ is a constant; or at least one of $W_1$ or $W_2$ is at least one of the following matrices:

$$b_6\begin{bmatrix}1&0\\e^{j\theta}&0\\0&1\\0&0\end{bmatrix}, b_6\begin{bmatrix}1&0\\0&0\\0&1\\0&e^{j\theta}\end{bmatrix}, b_6\begin{bmatrix}1&0\\0&1\\e^{j\theta}&0\\0&0\end{bmatrix}, \text{ or } b_6\begin{bmatrix}1&0\\0&1\\0&0\\0&e^{j\theta}\end{bmatrix},$$

where $b_6$ is a constant, and $\theta\in[0,2\pi]$; or at least one of $W_1$ or $W_2$ is at least one of the following matrices:

$$c_2\begin{bmatrix}1&0\\0&1\\0&0\\0&0\\0&0\\0&0\\0&0\\0&0\end{bmatrix}, c_2\begin{bmatrix}1&0\\0&0\\0&1\\0&0\\0&0\\0&0\\0&0\\0&0\end{bmatrix}, c_2\begin{bmatrix}1&0\\0&0\\0&0\\0&1\\0&0\\0&0\\0&0\\0&0\end{bmatrix}, c_2\begin{bmatrix}1&0\\0&0\\0&0\\0&0\\0&1\\0&0\\0&0\\0&0\end{bmatrix}, c_2\begin{bmatrix}1&0\\0&0\\0&0\\0&0\\0&0\\0&1\\0&0\\0&0\end{bmatrix},$$

$$c_2\begin{bmatrix}1&0\\0&0\\0&0\\0&0\\0&0\\0&0\\0&1\\0&0\end{bmatrix}, c_2\begin{bmatrix}1&0\\0&0\\0&0\\0&0\\0&0\\0&0\\0&0\\0&1\end{bmatrix}, c_2\begin{bmatrix}0&0\\1&0\\0&1\\0&0\\0&0\\0&0\\0&0\\0&0\end{bmatrix}, c_2\begin{bmatrix}0&0\\1&0\\0&0\\0&1\\0&0\\0&0\\0&0\\0&0\end{bmatrix}, c_2\begin{bmatrix}0&0\\1&0\\0&0\\0&0\\0&1\\0&0\\0&0\\0&0\end{bmatrix},$$

$$c_2\begin{bmatrix}0&0\\1&0\\0&0\\0&0\\0&0\\0&0\\0&1\\0&0\end{bmatrix}, c_2\begin{bmatrix}0&0\\1&0\\0&0\\0&0\\0&0\\0&0\\0&0\\0&1\end{bmatrix}, \text{ or } c_2\begin{bmatrix}0&0\\1&0\\0&0\\0&0\\0&0\\0&0\\0&0\\0&1\end{bmatrix},$$

where $c_2$ is a constant.

Optionally, the antenna selection matrix in $W_1$ and $W_2$ is used to select an antenna port for signal transmission.

Optionally, the antenna port includes at least two antenna elements, and antenna element weighting vectors corresponding to at least two antenna ports are different.

Optionally, at least two antenna ports are corresponding to a same group of antenna elements, and corresponding weighting vectors on the same group of antenna elements are different.

Figure 3:
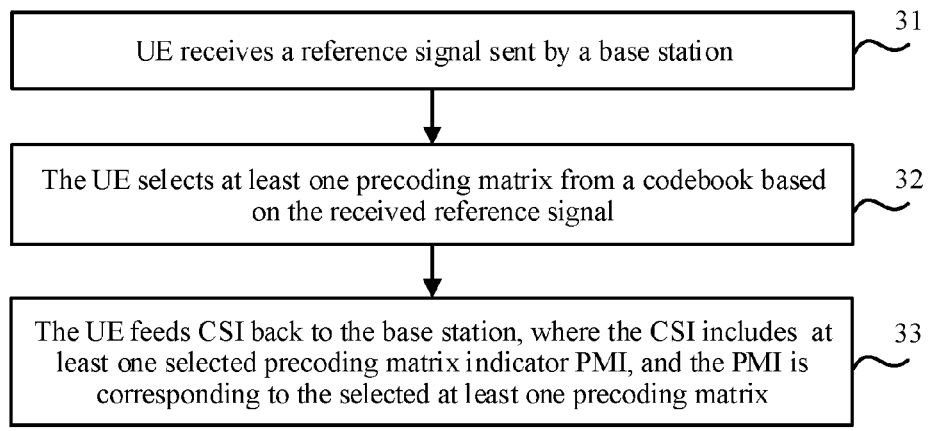
FIG. 3 is an implementation flowchart of a CSI reporting method according to an embodiment of the present invention.

Based on the foregoing provided apparatus, as shown in FIG. 3, FIG. 3 is an implementation flowchart of a CSI reporting method according to an embodiment of the present invention. The method may be performed by user equipment (UE), and includes the following steps:

Step 31: The user equipment receives a reference signal sent by a base station.

Specifically, the reference signal sent by the base station may include a channel state information reference signal (CSI RS), a demodulation reference signal (DM RS), or a cell-specific reference signal (CRS).

The user equipment may obtain a resource configuration of the reference signal by receiving a notification (for example, Radio Resource Control protocol (RRC) signaling or downlink control information (DCI)) of the base station eNB or based on a cell identity ID, and obtain the reference signal from a corresponding resource or subframe.

Each reference signal sent by the base station is corresponding to one antenna port. Optionally, the antenna port herein is described from a perspective of a user terminal. On a base station side, each drive network and antenna elements connected to the drive network may be together deemed as one virtual antenna port.

For example, if N antenna elements corresponding to a drive network 1 are the same as those corresponding to a drive network 2, a reference signal A is sent by using the drive network 1, and a reference signal B is sent by using the drive network 2, the drive network 1 and the corresponding N antenna elements are virtualized to be an antenna port 1, and the drive network 2 and the corresponding N antenna elements are virtualized to be an antenna port 2.

It should be noted that the drive network mentioned in this embodiment of the present invention is mainly configured to perform phase shifting on a transmit signal on the base station side, so as to change weighting vectors on antenna elements connected to the drive network.

Step 32: The user equipment selects at least one precoding matrix from a codebook based on the received reference signal. A precoding matrix W included in the codebook meets:

$$W = W_1 \otimes W_2; \quad (1)$$

where W is the precoding matrix included in the codebook, $\otimes$ is a Kronecker product, and at least one of $W_1$ or $W_2$ is an antenna selection matrix.

Optionally, $W_1$ and $W_2$ may be respectively corresponding to a horizontal dimension matrix vector and a vertical dimension matrix vector.

Figure 4A:
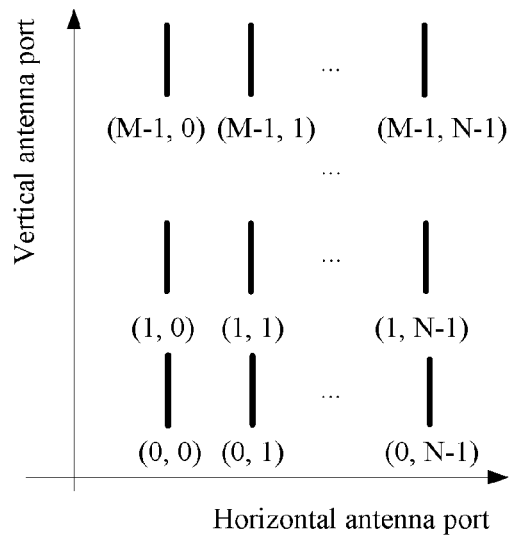
FIG. 4A is a schematic diagram of vertical antenna ports and horizontal antenna ports in an antenna configuration.
Figure 4B:
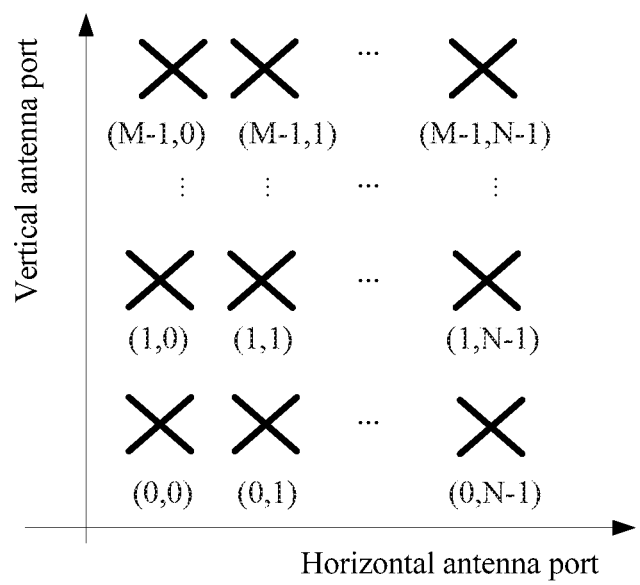
FIG. 4B is a schematic diagram of vertical antenna ports and horizontal antenna ports in an antenna configuration.

It should be noted that a precoding vector including the antenna selection matrix may be a vertical dimension antenna port, or a horizontal dimension antenna port, which is not limited herein. The vertical dimension antenna port described herein refers to each column of antenna ports in a planar antenna array, and the horizontal dimension antenna port refers to each row of antenna ports in the planar antenna array. For example, vertical antenna ports and horizontal antenna ports in an antenna configuration are shown in FIG. 4A. There are N horizontal antenna ports and M vertical antenna ports in FIG. 4A, and each antenna port is corresponding to one group of antenna elements. Vertical antenna ports and horizontal antenna ports in another antenna configuration are shown in FIG. 4B. There are 2N horizontal antenna ports and M vertical antenna ports in FIG. 4B, and each antenna port is corresponding to one group of antenna elements.

Optionally, in the antenna selection matrix, each column has at least one zero element.

Based on the foregoing conditions, at least one of $W_1$ or $W_2$ may be at least one of the following matrices:

$$a\begin{bmatrix}1\\0\end{bmatrix} \text{ or } a\begin{bmatrix}0\\1\end{bmatrix},$$

where a is a constant; or
at least one of $W_1$ or $W_2$ may be at least one of the following matrices:

$$b\begin{bmatrix}1\\0\\0\\0\end{bmatrix}, b\begin{bmatrix}0\\1\\0\\0\end{bmatrix}, b\begin{bmatrix}0\\0\\1\\0\end{bmatrix}, \text{ or } b\begin{bmatrix}0\\0\\0\\1\end{bmatrix},$$

where b is a constant; or
at least one of $W_1$ or $W_2$ may be at least one of the following matrices:

$$b_1\begin{bmatrix}1\\0\\e^{j\theta}\\0\end{bmatrix}, b_1\begin{bmatrix}0\\1\\0\\e^{j\theta}\end{bmatrix}, b_1\begin{bmatrix}1\\e^{j\theta}\\0\\0\end{bmatrix}, b_1\begin{bmatrix}0\\0\\1\\e^{j\theta}\end{bmatrix}, b_1\begin{bmatrix}1\\0\\0\\e^{j\theta}\end{bmatrix}, \text{ or } b_1\begin{bmatrix}0\\1\\e^{j\theta}\\0\end{bmatrix},$$

where $b_1$ is a constant, and $\theta \in [0,2\pi]$; or
at least one of $W_1$ or $W_2$ is at least one of the following matrices:

$$b_2\begin{bmatrix}1\\e^{j\theta_1}\\e^{j\theta_2}\\0\end{bmatrix}, b_2\begin{bmatrix}1\\0\\e^{j\theta_1}\\e^{j\theta_2}\end{bmatrix}, b_2\begin{bmatrix}1\\e^{j\theta_1}\\0\\e^{j\theta_2}\end{bmatrix}, \text{ or } b_2\begin{bmatrix}0\\1\\e^{j\theta_1}\\e^{j\theta_2}\end{bmatrix},$$

where $b_2$ is a constant, and $\theta_1, \theta_2 \in [0,2\pi]$; or
at least one of $W_1$ or $W_2$ is at least one of the following matrices:

$$c\begin{bmatrix}1\\0\\0\\0\\0\\0\\0\\0\end{bmatrix}, c\begin{bmatrix}0\\1\\0\\0\\0\\0\\0\\0\end{bmatrix}, c\begin{bmatrix}0\\0\\1\\0\\0\\0\\0\\0\end{bmatrix}, c\begin{bmatrix}0\\0\\0\\1\\0\\0\\0\\0\end{bmatrix}, c\begin{bmatrix}0\\0\\0\\0\\1\\0\\0\\0\end{bmatrix}, c\begin{bmatrix}0\\0\\0\\0\\0\\1\\0\\0\end{bmatrix}, c\begin{bmatrix}0\\0\\0\\0\\0\\0\\1\\0\end{bmatrix}, \text{ or } c\begin{bmatrix}0\\0\\0\\0\\0\\0\\0\\1\end{bmatrix},$$

or a quantity of non-zero elements in the matrix may be two, three, four, five, six, or seven, where c is a constant.

It should be noted that in the multiple matrix forms listed above, $W_1$ and $W_2$ may be selected from only one of the matrix forms, or selected from multiple matrix forms.

Further, at least one of $W_1$ or $W_2$ may be at least one of the following matrices:

$$a_2\begin{bmatrix}1 & 0\\0 & e^{j\theta}\end{bmatrix},$$

where $a_2$ is a constant; or
at least one of $W_1$ or $W_2$ may be at least one of the following matrices:

$$b_4\begin{bmatrix}1 & 1\\e^{j\theta} & -e^{j\theta}\\0 & 0\\0 & 0\end{bmatrix}, b_4\begin{bmatrix}0 & 0\\0 & 0\\1 & 1\\e^{j\theta} & -e^{j\theta}\end{bmatrix}, b_4\begin{bmatrix}1 & 1\\0 & 0\\e^{j\theta} & -e^{j\theta}\\0 & 0\end{bmatrix},$$

$$b_4\begin{bmatrix}1 & 1\\0 & 0\\0 & 0\\e^{j\theta} & -e^{j\theta}\end{bmatrix}, b_4\begin{bmatrix}0 & 0\\1 & 1\\e^{j\theta} & -e^{j\theta}\\0 & 0\end{bmatrix}, \text{ or } b_4\begin{bmatrix}0 & 0\\1 & 1\\0 & 0\\e^{j\theta} & -e^{j\theta}\end{bmatrix},$$

where $b_4$ is a constant, and $\theta \in [0,2\pi]$; or
at least one of $W_1$ or $W_2$ may be at least one of the following matrices:

$$b_5\begin{bmatrix}1 & 0\\0 & 1\\0 & 0\\0 & 0\end{bmatrix}, b_5\begin{bmatrix}1 & 0\\0 & 0\\0 & 1\\0 & 0\end{bmatrix}, b_5\begin{bmatrix}1 & 0\\0 & 0\\0 & 0\\0 & 1\end{bmatrix}, b_5\begin{bmatrix}0 & 0\\1 & 0\\0 & 1\\0 & 0\end{bmatrix}, b_5\begin{bmatrix}0 & 0\\1 & 0\\0 & 0\\0 & 1\end{bmatrix}, \text{ or }$$

$$b_5\begin{bmatrix}0 & 0\\0 & 0\\1 & 0\\0 & 1\end{bmatrix},$$

where $b_5$ is a constant; or
at least one of $W_1$ or $W_2$ may be at least one of the following matrices:

$$b_6 \begin{bmatrix} 1 & 0 \\ e^{j\theta} & 0 \\ 0 & 1 \\ 0 & 0 \end{bmatrix}, b_6 \begin{bmatrix} 1 & 0 \\ 0 & 0 \\ 0 & 1 \\ 0 & e^{j\theta} \end{bmatrix}, b_6 \begin{bmatrix} 1 & 0 \\ 0 & 1 \\ e^{j\theta} & 0 \\ 0 & 0 \end{bmatrix}, \text{ or } b_6 \begin{bmatrix} 1 & 0 \\ 0 & 1 \\ 0 & 0 \\ 0 & e^{j\theta} \end{bmatrix},$$

where $b_6$ is a constant, and $\theta \in [0, 2\pi]$; or at least one of $W_1$ or $W_2$ may be at least one of the following matrices:

$$c_2 \begin{bmatrix} 1 & 0 \\ 0 & 1 \\ 0 & 0 \\ 0 & 0 \\ 0 & 0 \\ 0 & 0 \\ 0 & 0 \\ 0 & 0 \end{bmatrix}, c_2 \begin{bmatrix} 1 & 0 \\ 0 & 0 \\ 0 & 1 \\ 0 & 0 \\ 0 & 0 \\ 0 & 0 \\ 0 & 0 \\ 0 & 0 \end{bmatrix}, c_2 \begin{bmatrix} 1 & 0 \\ 0 & 0 \\ 0 & 0 \\ 0 & 1 \\ 0 & 0 \\ 0 & 0 \\ 0 & 0 \\ 0 & 0 \end{bmatrix}, c_2 \begin{bmatrix} 1 & 0 \\ 0 & 0 \\ 0 & 0 \\ 0 & 0 \\ 0 & 1 \\ 0 & 0 \\ 0 & 0 \\ 0 & 0 \end{bmatrix}, c_2 \begin{bmatrix} 1 & 0 \\ 0 & 0 \\ 0 & 0 \\ 0 & 0 \\ 0 & 0 \\ 0 & 1 \\ 0 & 0 \\ 0 & 0 \end{bmatrix},$$

$$c_2 \begin{bmatrix} 1 & 0 \\ 0 & 0 \\ 0 & 0 \\ 0 & 0 \\ 0 & 0 \\ 0 & 0 \\ 0 & 1 \\ 0 & 0 \end{bmatrix}, c_2 \begin{bmatrix} 1 & 0 \\ 0 & 0 \\ 0 & 0 \\ 0 & 0 \\ 0 & 0 \\ 0 & 0 \\ 0 & 0 \\ 0 & 1 \end{bmatrix}, c_2 \begin{bmatrix} 0 & 0 \\ 1 & 0 \\ 0 & 1 \\ 0 & 0 \\ 0 & 0 \\ 0 & 0 \\ 0 & 0 \\ 0 & 0 \end{bmatrix}, c_2 \begin{bmatrix} 0 & 0 \\ 1 & 0 \\ 0 & 0 \\ 0 & 1 \\ 0 & 0 \\ 0 & 0 \\ 0 & 0 \\ 0 & 0 \end{bmatrix}, c_2 \begin{bmatrix} 0 & 0 \\ 1 & 0 \\ 0 & 0 \\ 0 & 0 \\ 0 & 0 \\ 0 & 0 \\ 0 & 0 \\ 0 & 1 \end{bmatrix},$$

$$c_2 \begin{bmatrix} 0 & 0 \\ 1 & 0 \\ 0 & 0 \\ 0 & 0 \\ 0 & 0 \\ 0 & 0 \\ 0 & 1 \\ 0 & 0 \end{bmatrix}, c_2 \begin{bmatrix} 0 & 0 \\ 1 & 0 \\ 0 & 0 \\ 0 & 0 \\ 0 & 0 \\ 0 & 0 \\ 0 & 0 \\ 0 & 1 \end{bmatrix}, \text{ or } c_2 \begin{bmatrix} 0 & 0 \\ 1 & 0 \\ 0 & 0 \\ 0 & 0 \\ 0 & 0 \\ 0 & 0 \\ 0 & 0 \\ 0 & 1 \end{bmatrix},$$

where $c_2$ is a constant.

It should be noted that only some relatively typical matrices in the foregoing last matrix form are listed. In an actual application, each column only needs to have at least one zero element.

In this embodiment of the present invention, the antenna selection matrix in $W_1$ and $W_2$ is mainly used to select an antenna port for signal transmission. For example, when $$W_2 = \begin{bmatrix} 1 \\ 0 \end{bmatrix},$$

that is, when $W_2$ represents a vertical dimension precoding vector, one antenna port is selected from two antenna ports in a vertical dimension.

It should be noted that the precoding vector including the antenna selection matrix may be a vertical dimension antenna, or a horizontal dimension antenna, which is not limited herein.

The antenna port may include at least two antenna elements, and antenna element weighting vectors corresponding to at least two antenna ports are different.

Further, at least two antenna ports may be corresponding to a same group of antenna elements, and corresponding weighting vectors on the same group of antenna elements are different.

In an example, four antenna elements (a1, a2, a3, and a4) are corresponding to each of the drive network 1 and the drive network 2. Therefore, a corresponding phase weighting vector of the drive network 1 on the four antenna elements may be:

$$\overset{v}{v_1} = \begin{bmatrix} 1 \\ e^{j\theta_1} \\ e^{j\theta_2} \\ e^{j\theta_3} \end{bmatrix};$$

and a corresponding phase weighting vector of the drive network 2 on the four antenna elements may be:

$$\overset{v}{v_2} = \begin{bmatrix} 1 \\ e^{j\theta_4} \\ e^{j\theta_5} \\ e^{j\theta_6} \end{bmatrix}, \text{ where } \overset{v}{v_1} \neq \overset{v}{v_2}.$$

In addition, when the at least one precoding matrix is selected from the codebook, the at least one precoding matrix may be selected according to a predefined criterion. The predetermined criterion may include but is not limited to at least one of the following criteria:

a maximum channel capacity criterion, a maximum throughput criterion, or a minimum chordal distance criterion.

Specifically, the user equipment may obtain, based on the reference signal, a channel estimation value; calculate a channel capacity, a throughput, a chordal distance, or the like based on the channel estimation value and a precoding matrix in the codebook; and select the corresponding precoding matrix from the codebook according to the foregoing predefined criterion.

The codebook in this embodiment of the present invention may be predefined; or may be reported by the user equipment to the base station eNB, determined by the base station eNB based on reporting of the user equipment, and notified to the user equipment; or the codebook is a codebook determined and reported by the user equipment, for example, a recently reported codebook.

Step 33: The user equipment feeds CSI back to the base station, where the CSI includes at least one selected precoding matrix indicator PMI, and the PMI is corresponding to the selected at least one precoding matrix.

The base station learns, from the CSI, the precoding matrix selected by the user equipment, that is, a selected corresponding antenna port.

Specifically, an implementation manner of this step may be:

The user equipment sends the CSI including the PMI to the base station, the PMI may include only one specific value, and in this case, PMI information directly indicates the precoding matrix W. For example, there are totally 256 different precoding matrices, and the precoding matrices W numbered with 0, 1, . . . , and 255 may be respectively indicated by using PMI=0, . . . , and 255.

Specifically, another implementation manner of this step may be: The user equipment sends the CSI including the PMI to the base station, and the PMI may include a $PMI_1$ and a $PMI_2$, where the $PMI_1$ and the $PMI_2$ are respectively corresponding to $W_1$ and $W_2$ in the foregoing formula (1). The $PMI_1$ may also be represented by a $PMI_{11}$ and a $PMI_{12}$, and the $PMI_2$ may also be represented by a $PMI_{21}$ and a $PMI_{22}$.

In addition, the precoding matrix may be included in a precoding matrix set or a codebook, and the PMI is used to indicate the precoding matrix selected from the precoding matrix set or the codebook.

Further, the PMI may have different time domain granularities or frequency domain granularities, or different time domain granularities or frequency domain granularities are obtained based on different subframe periods or subband sizes.

Specifically, sending, by the user equipment, the CSI including the PMI to the base station may be sending, by the user equipment, the CSI to the base station by using a physical uplink control channel (PUCCH) or a physical uplink shared channel (PUSCH).

It should be noted that the precoding matrix W described in this embodiment of the present invention may be a precoding matrix obtained after row or column permutation. For example, a different antenna number correspondingly leads to row permutation of the precoding matrix.

In this embodiment of the present invention, at least one precoding matrix is selected from a codebook based on a reference signal sent by a base station, and CSI is sent to the base station. The CSI includes at least one selected precoding matrix indicator PMI, and the PMI is corresponding to the selected at least one precoding matrix. At least one precoding matrix W included in the codebook meets: $W = W_1 \otimes W_2$, where $\otimes$ is a Kronecker product, and at least one of $W_1$ or $W_2$ is an antenna selection matrix. Therefore, in this embodiment of the present invention, the base station can select, according to the at least one precoding matrix that is fed back, one or more antenna ports to send a signal. Each antenna port is corresponding to one antenna element phase weighting vector. A different antenna element phase weighting vector is selected by selecting a different antenna port, so that an antenna beam is changed, which can effectively improve an antenna beam coverage status.

Figure 4C:
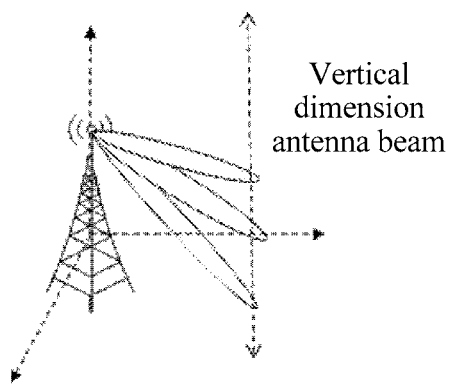
FIG. 4C shows antenna beams formed in a vertical dimension.
Figure 4D:
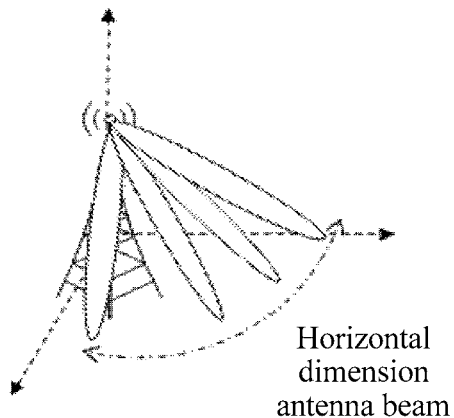
FIG. 4D shows antenna beams formed in a horizontal dimension.

Optionally, antenna beams may be formed in the vertical dimension, a horizontal dimension, or both the vertical and horizontal dimensions. For example, antenna beams in the vertical dimension are shown in FIG. 4C, and antenna beams in the horizontal dimension are shown in FIG. 4D.

Figure 5:
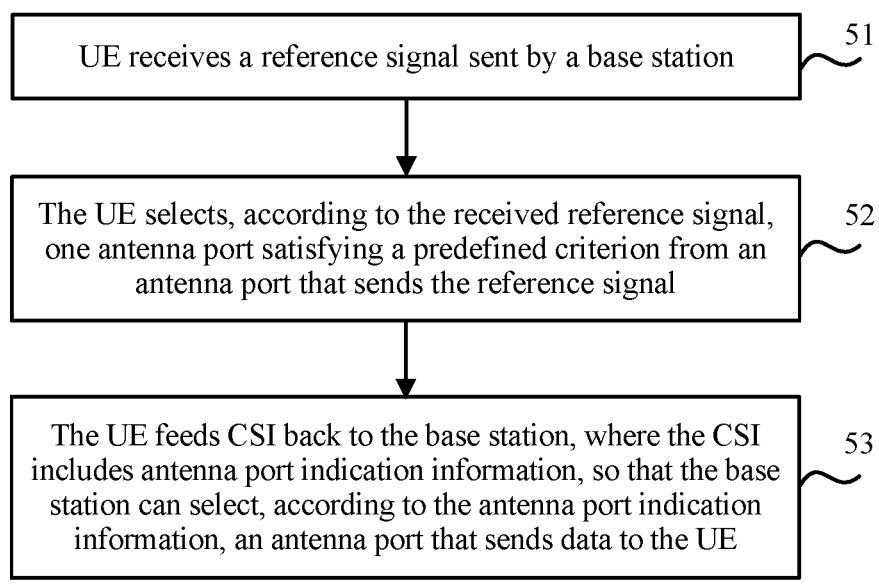
FIG. 5 is an implementation flowchart of another CSI reporting method according to an embodiment of the present invention.

Besides the foregoing CSI reporting method based on the precoding matrix, an embodiment of the present invention further provides another CSI reporting method. As shown in FIG. 5, FIG. 5 is an implementation flowchart of the method. The method may be performed by user equipment. The method includes the following steps:

Step 51: The user equipment receives a reference signal sent by a base station.

Specifically, the reference signal sent by the base station may include a channel state information reference signal (CSI RS), a demodulation reference signal (DM RS), or a cell-specific reference signal (CRS).

The user equipment may obtain a resource configuration of the reference signal by receiving a notification (for example, Radio Resource Control protocol (RRC) signaling or downlink control information (DCI)) of the base station eNB or based on a cell identity ID, and obtain the reference signal from a corresponding resource or subframe.

The reference signal sent by the base station may be sent by one or more antenna ports simultaneously. Optionally, the antenna port herein is described from a perspective of a user terminal. On a base station side, each drive network and corresponding antenna elements may be together deemed as one virtual antenna port.

Step 52: The user equipment selects, according to the received reference signal, an antenna port from an antenna port that sends the reference signal.

An antenna element phase weighting vectors corresponding to antenna ports that send the reference signal are different.

The antenna port may be selected based on the reference signal according to at least one of predefined criteria including but not limited to the following:

a maximum signal-to-noise ratio criterion, a maximum signal-to-interference-plus-noise ratio criterion, a maximum receive signal power criterion, a maximum channel capacity criterion, or a maximum throughput criterion.

Specifically, the user equipment may obtain signal power, an interference estimation value, a channel estimation value, and the like according to the received reference signal, and select the corresponding antenna port according to the foregoing predefined criterion.

For example, the maximum channel capacity criterion is used as an example. After receiving the reference signal, the user equipment measures a channel of each antenna port that sends the reference signal, calculates a channel capacity, and selects an antenna port that maximizes the channel capacity.

Steps 53: The user equipment feeds CSI back to the base station, where the CSI includes antenna port indication information, so that the base station can select, according to the antenna port indication information, an antenna port that sends data to the user equipment.

Specifically, the user equipment may send the CSI by using a physical uplink control channel (PUCCH) or a physical uplink shared channel (PUSCH).

In this embodiment of the present invention, a base station uses different antenna ports to send a reference signal to a user terminal. Antenna element phase weighting vectors corresponding to at least two antenna ports that send the reference signal are different; therefore, the user terminal may select independently, according to the received reference signal, an antenna port serving the user terminal, and feeds the selected antenna port back to the base station. Therefore, stronger signal coverage is achieved, and a prior-art problem of a disadvantage in signal coverage in a vertical (or horizontal) direction resulting from a fixed or inflexible antenna beam is avoided.

An embodiment of the present invention further provides an antenna structure implementation solution corresponding to the foregoing CSI reporting solutions.

Figure 6:
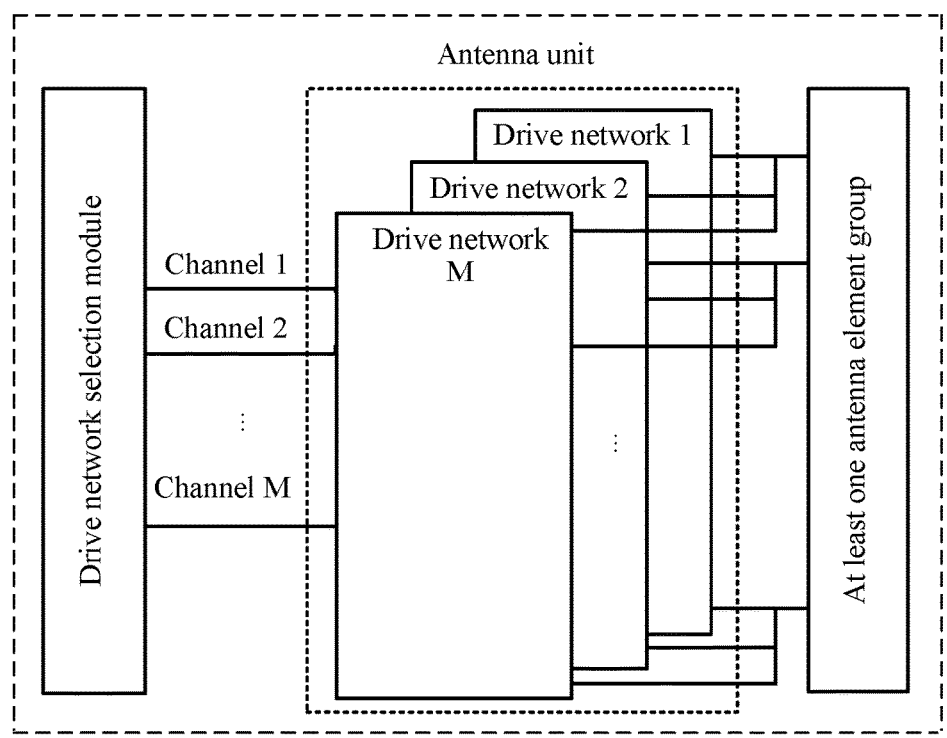
FIG. 6 is a schematic structural diagram of an antenna unit according to an embodiment of the present invention.

The base station antenna includes at least one antenna unit. As shown in FIG. 6, FIG. 6 is a schematic structural diagram of an antenna unit according to an embodiment of the present invention. The antenna unit includes: a drive network selection module, at least two drive networks, and at least one antenna element group, each antenna element group includes at least two antenna elements, and antenna element weighting vectors corresponding to the drive networks are different from each other, where:

the drive network selection module is connected to each drive network, and is configured to select one drive network from the at least two drive networks, so that a transmit signal is transmitted to the selected drive network;

the drive network is connected to each antenna element in any antenna element group, and is configured to: perform phase shifting on the transmit signal, and transmit a transmit signal obtained after the phase shifting to each connected antenna element in the antenna element group; and the antenna element group is configured to send the transmit signal obtained after the phase shifting.

Each drive network is connected to each antenna element in any antenna element group; a high-gain beam may be formed by using all the antenna elements in the antenna element group; and further, all antenna transmit power can be used, thereby achieving an effect of maximizing an antenna gain.

Optionally, in this embodiment of the present invention, each antenna element group may be corresponding to at least two drive networks.

Optionally, the antenna unit may further include: signal combiners in a one-to-one correspondence with the antenna elements in each antenna element group, where:

each signal combiner may be disposed at transmit signal output ends of drive networks corresponding to each antenna element, and is configured to: combine transmit signals obtained after phase shifting performed by the drive networks, and then send a combined transmit signal to the corresponding antenna element.

Optionally, the antenna unit may further include power amplifiers (PA) with a power amplification function.

First Case:

The antenna unit includes power amplifiers in a one-to-one correspondence with the drive networks, where each power amplifier is disposed before a corresponding drive network, and is configured to: perform power amplification on the received transmit signal, and then send the transmit signal obtained after the power amplification to the corresponding drive network.

Second Case:

The antenna unit includes power amplifiers in a one-to-one correspondence with antenna elements in an antenna element group, where each power amplifier is disposed between each antenna element and transmit signal output ends of drive networks corresponding to the antenna element, and is configured to: perform power amplification on transmit signals obtained after phase shifting performed by the drive networks, and then send the transmit signals obtained after the power amplification to the corresponding antenna element.

It should be noted that an essential function of the drive network in this embodiment of the present invention is to change a phase weighting value of a signal on each antenna element, and may be implemented by means of software or hardware.

Based on the foregoing description of the structure of the antenna unit, an architecture of the base station antenna provided in this embodiment of the present invention may be but is not limited to the following architectures:

It should be noted that the following describes base station antennas including signal combiners. If a base station antenna does not include signal combiners, positions of the signal combiners only needs to be directly changed to lead wires for direct connection.

Figure 7:
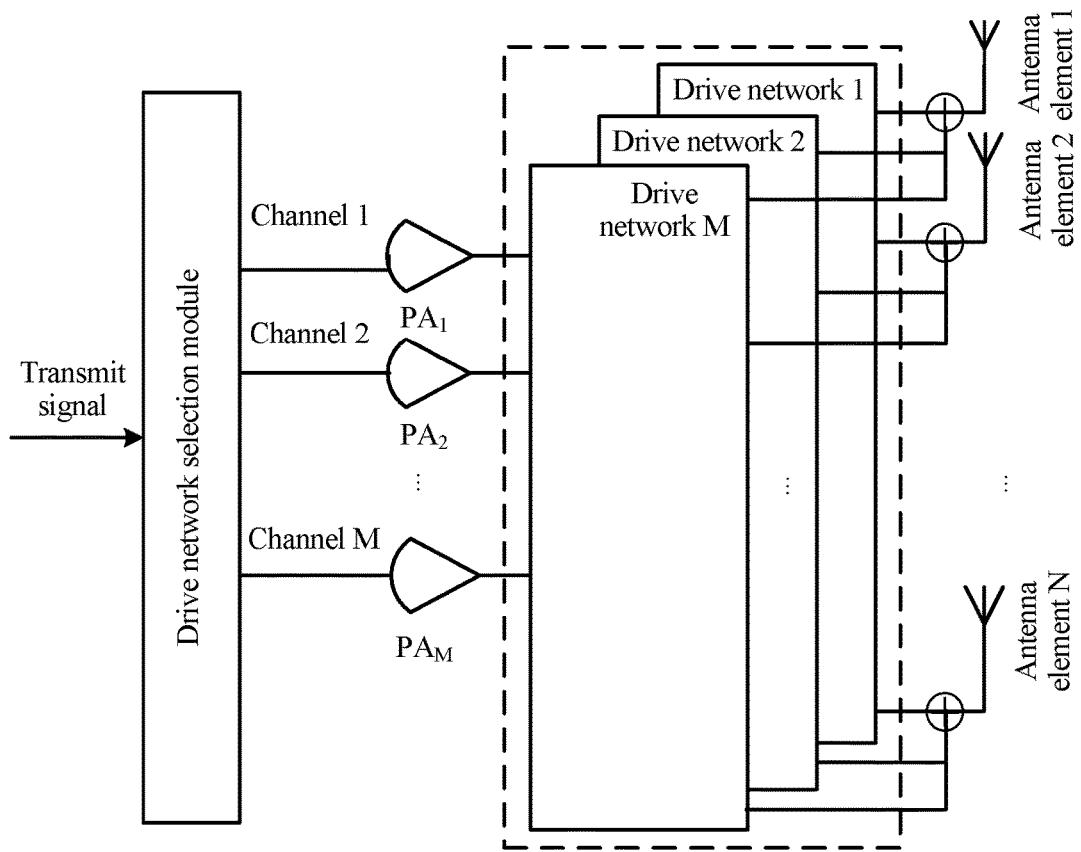
FIG. 7 is a schematic architectural diagram of a base station antenna according to an embodiment of the present invention.

First Architecture:

As shown in FIG. 7, FIG. 7 is a schematic architectural diagram of a base station antenna according to an embodiment of the present invention. The base station antenna includes one antenna unit. There is totally one drive network selection module, M drive networks, M power amplifiers, one antenna element group (including N antenna elements), and N signal combiners.

The drive network selection module is connected to the M drive networks, and the power amplifier is disposed before each drive network.

Each drive network is connected to the N antenna elements.

Each signal combiner is disposed at transmit signal output ends of the drive networks corresponding to each antenna element.

Figure 8:
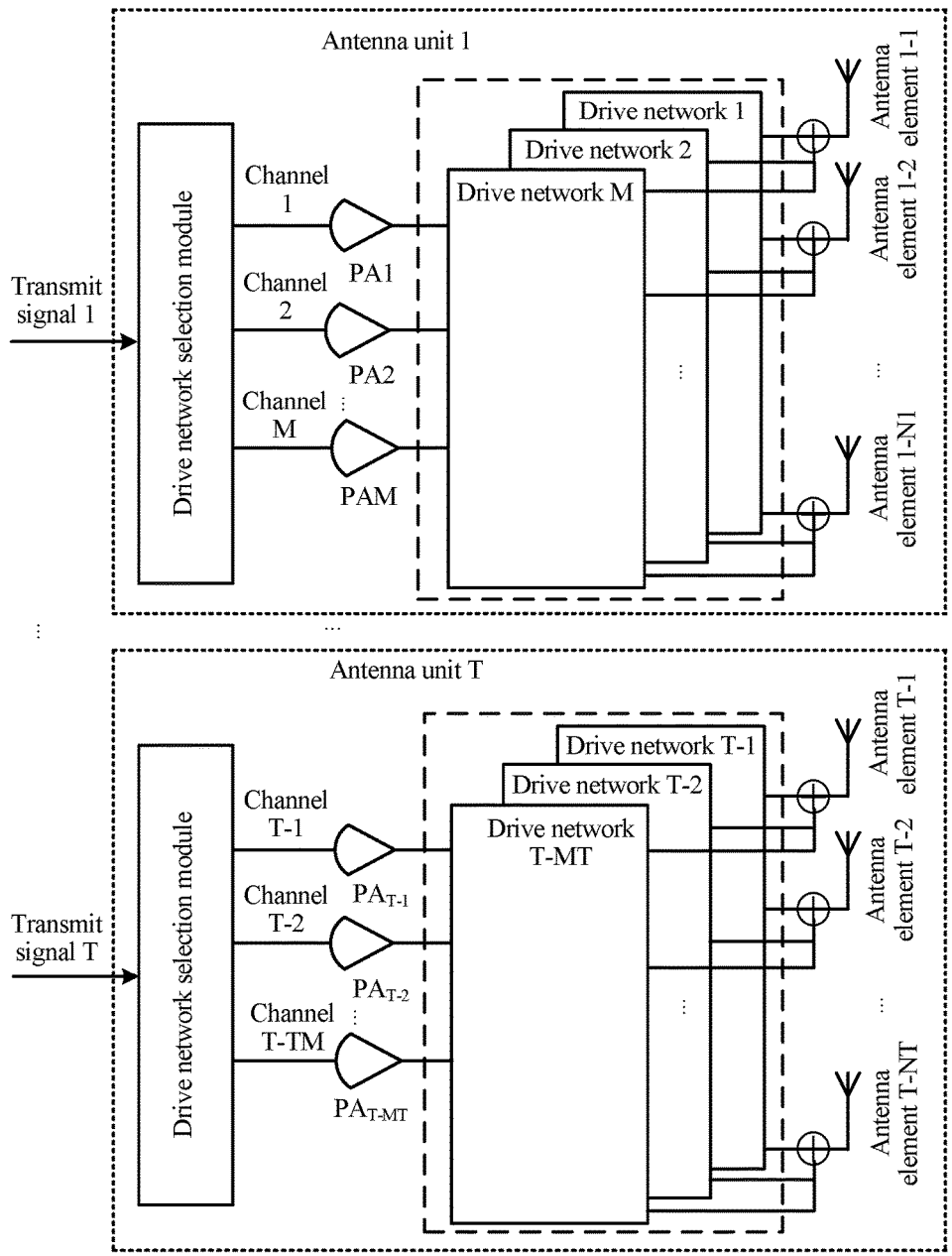
FIG. 8 is a schematic structural diagram of another base station antenna according to an embodiment of the present invention.

Second Architecture:

As shown in FIG. 8, FIG. 8 is a schematic structural diagram of another base station antenna according to an embodiment of the present invention. The base station antenna includes at least two antenna units. Each antenna unit includes one drive network selection module, M drive networks, M power amplifiers, one antenna element group (including multiple antenna elements), and signal combiners in a one-to-one correspondence with the antenna elements.

In this architecture, a structure of each antenna unit is the same as that of the antenna unit of the base station antenna in the foregoing first architecture, and details are not described herein again.

It should be noted that quantities of antenna elements included in antenna element groups in different antenna units may be the same or different. For example, referring to FIG. 8, an antenna element group in an antenna unit 1 includes N1 antenna elements, and an antenna element group in an antenna unit T includes NT antenna elements, where N1 and NT may be the same or different.

Figure 9:
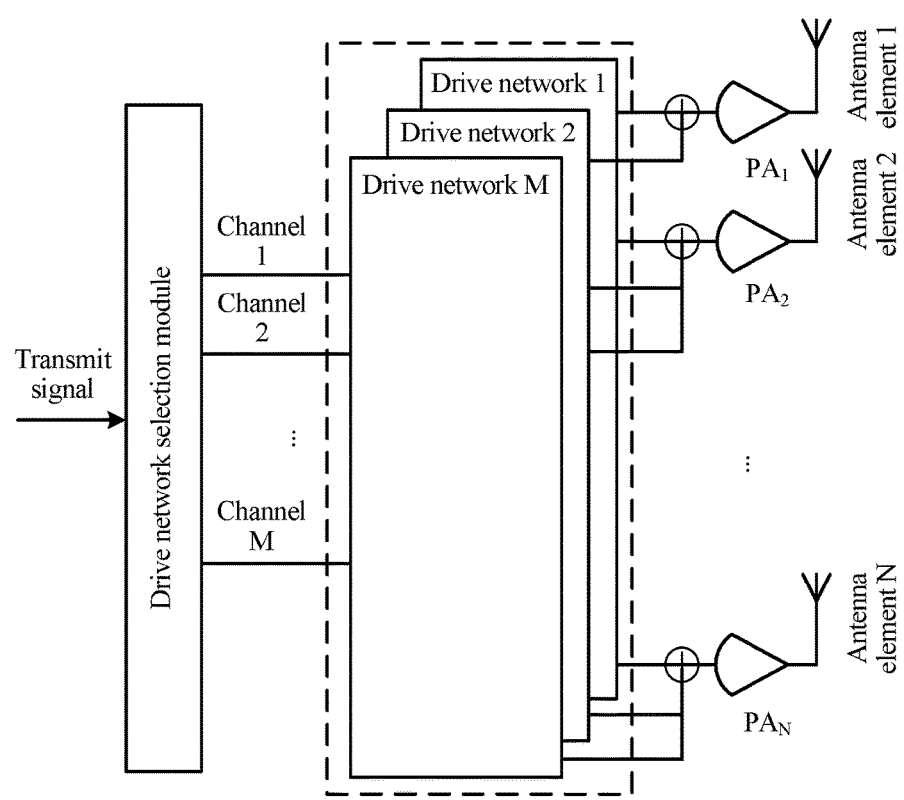
FIG. 9 is a schematic structural diagram of another base station antenna according to an embodiment of the present invention.

Third Architecture:

As shown in FIG. 9, FIG. 9 is a schematic structural diagram of another base station antenna according to an embodiment of the present invention. The base station antenna includes one antenna unit. There is totally one drive network selection module, M drive networks, one antenna element group (including N antenna elements), N power amplifiers, and N signal combiners.

The drive network selection module is connected to the M drive networks.

Each drive network is connected to the N antenna elements, each power amplifier is disposed between each antenna element and transmit signal output ends of the drive networks corresponding to the antenna element, and each signal combiner is disposed at the transmit signal output ends of the drive networks corresponding to each antenna element.

Figure 10:
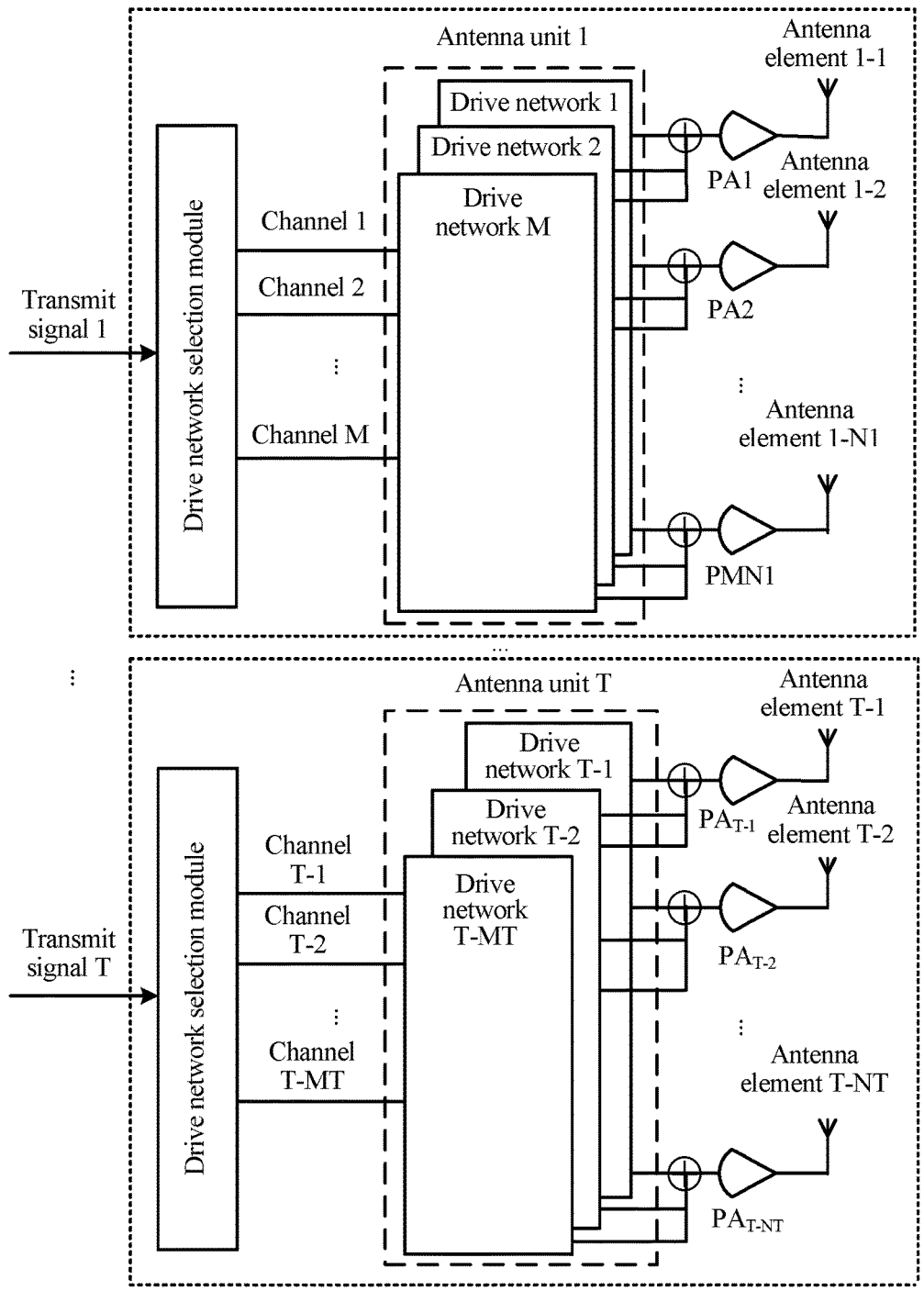
FIG. 10 is a schematic structural diagram of another base station antenna according to an embodiment of the present invention.

Fourth Architecture:

As shown in FIG. 10, FIG. 10 is a schematic structural diagram of another base station antenna according to an embodiment of the present invention. The base station antenna includes at least two antenna units. Each antenna unit includes one drive network selection module, M drive networks, one antenna element group (including at least two antenna elements), and power amplifiers and signal combiners in a one-to-one correspondence with the antenna elements.

In this architecture, a structure of each antenna unit is the same as that of the antenna unit of the base station antenna in the foregoing third architecture, and details are not described herein again.

Figure 11:
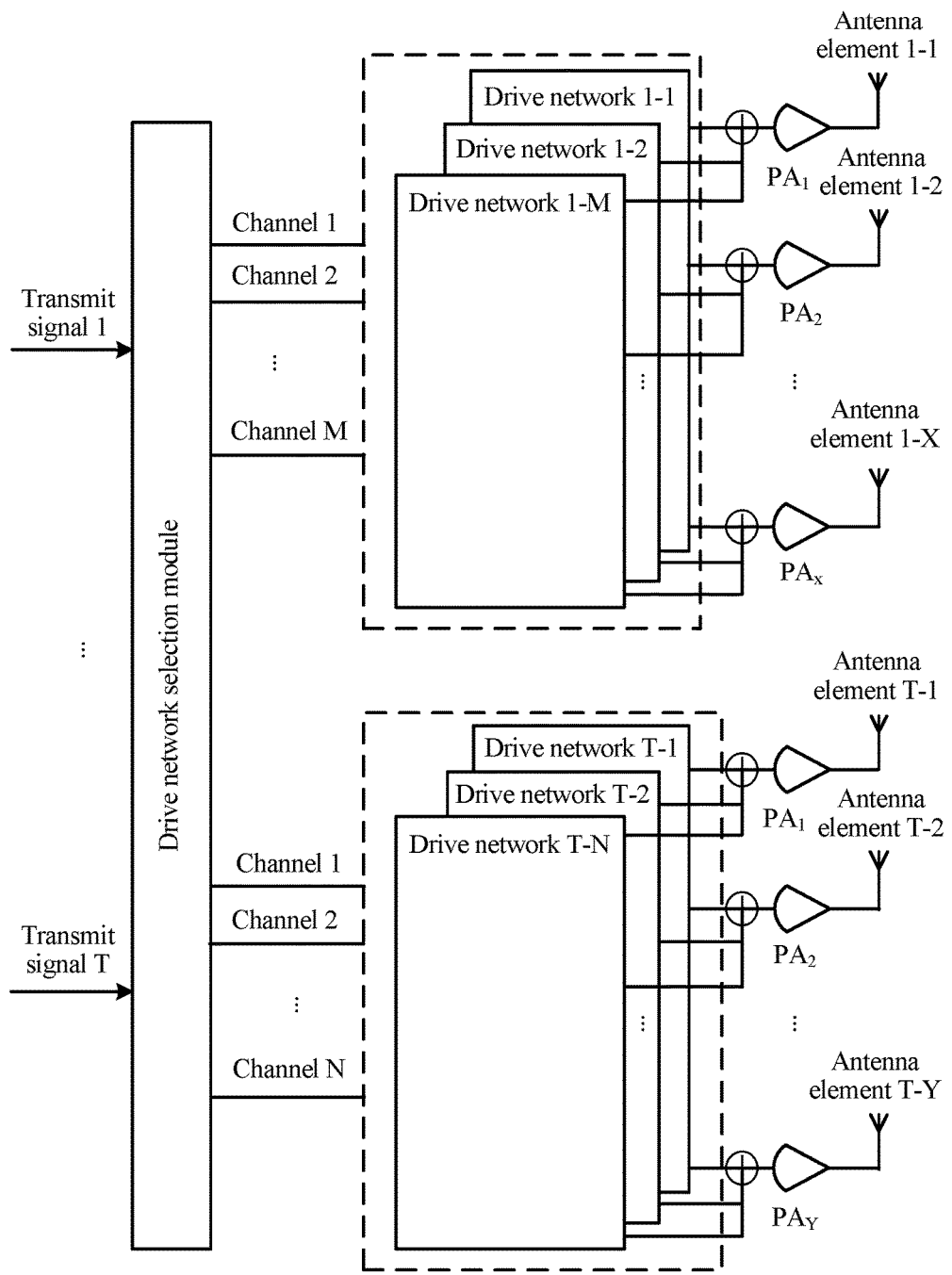
FIG. 11 is a schematic structural diagram of another base station antenna according to an embodiment of the present invention.

Fifth Architecture:

As shown in FIG. 11, FIG. 11 is a schematic structural diagram of another base station antenna according to an embodiment of the present invention. The base station antenna includes at least one antenna unit (each antenna unit is similar in structure; therefore, only one antenna unit is depicted in FIG. 11), and each antenna unit includes one drive network selection module, multiple drive networks, T antenna element groups (an antenna element group 1 includes X antenna elements, . . . , and an antenna element group T includes Y antenna elements), and power amplifiers and signal combiners in a one-to-one correspondence with all the antenna elements.

The drive network selection module is connected to each drive network.

1-1 to 1-M drive networks are connected to each antenna element in the antenna element group 1, and T-1 to T-N drive networks are connected to each antenna element in the antenna element group T (a connection relationship between another drive network and another antenna element group is not depicted in FIG. 11).

Each power amplifier is disposed between each antenna element and transmit signal output ends of drive networks corresponding to the antenna element, and each signal combiner is disposed at the transmit signal output ends of the drive networks corresponding to each antenna element.

Figure 12:
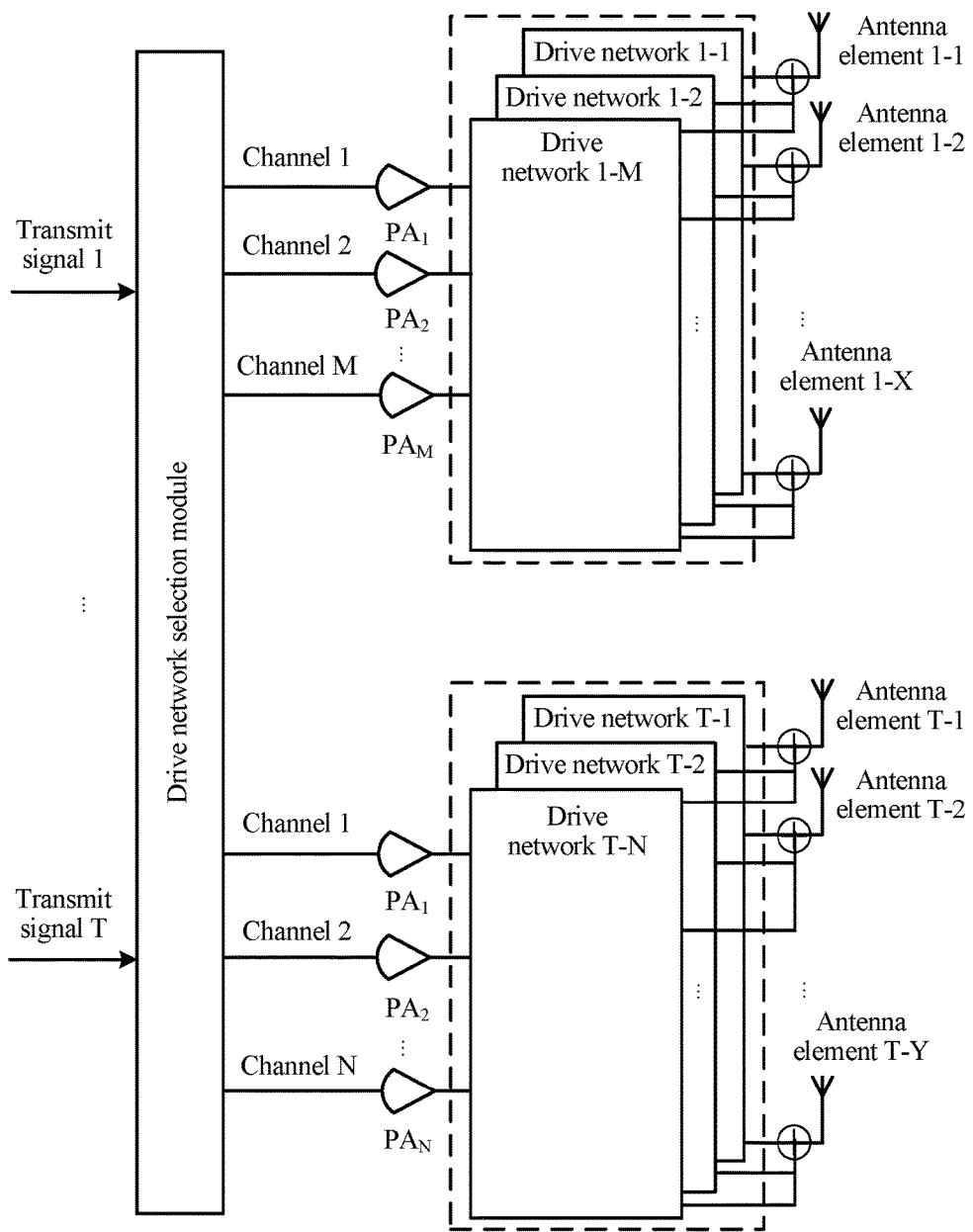
FIG. 12 is a schematic structural diagram of another base station antenna according to an embodiment of the present invention.

Sixth Architecture:

As shown in FIG. 12, FIG. 12 is a schematic structural diagram of another base station antenna according to an embodiment of the present invention. The base station antenna includes at least one antenna unit (each antenna unit is similar in structure; therefore, only one antenna unit is depicted in FIG. 12), and each antenna unit includes one drive network selection module, multiple drive networks, T antenna element groups (an antenna element group 1 includes X antenna elements, . . . , and an antenna element group T includes Y antenna elements), signal combiners in a one-to-one correspondence with all the antenna elements, and power amplifiers in a one-to-one correspondence with the drive networks.

The drive network selection module is connected to each drive network.

1-1 to 1-M drive networks are connected to each antenna element in the antenna element group 1, and T-1 to T-N drive networks are connected to each antenna element in the antenna element group T (a connection relationship between another drive network and another antenna element group is not depicted in FIG. 12).

Each power amplifier is disposed before each drive network, and each signal combiner is disposed at transmit signal output end of drive networks corresponding to each antenna element.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept.

It will be appreciated that persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

Additionally, statements made herein characterizing the invention refer to an embodiment of the invention and not necessarily all embodiments.

What is claimed is:

1. A channel state information (CSI) reporting apparatus, comprising:
    a transmitter;
    a processor;
    a memory; and
    a communications bus, wherein both the processor and the memory are connected to the communications bus;
    wherein the memory is connected to the processor, and stores program code; and
    wherein the processor is connected to the memory, and is configured to execute the stored program code to facilitate:
        receiving a reference signal sent by a base station;
        selecting at least one precoding matrix from a codebook based on the reference signal, wherein the codebook comprises a precoding matrix W, and W meets: $W = W_1 \otimes W_2$, where $\otimes$ is a Kronecker product, and at least one of $W_1$ or $W_2$ is an antenna selection matrix used for selecting an antenna port for signal transmission; and
        sending, via the transmitter, CSI to the base station, wherein the CSI comprises at least one selected precoding matrix indicator (PMI), and the at least one selected PMI corresponds to the at least one selected precoding matrix;
    wherein at least one of $W_1$ or $W_2$ is at least one of the following matrices:

$$b_4\begin{bmatrix}1&1\\e^{j\theta}&-e^{j\theta}\\0&0\\0&0\end{bmatrix}, b_4\begin{bmatrix}0&0\\0&0\\1&1\\e^{j\theta}&-e^{j\theta}\end{bmatrix}, b_4\begin{bmatrix}1&1\\0&0\\e^{j\theta}&-e^{j\theta}\\0&0\end{bmatrix},$$

$$b_4\begin{bmatrix}1&1\\0&0\\0&0\\e^{j\theta}&-e^{j\theta}\end{bmatrix}, b_4\begin{bmatrix}0&0\\1&1\\e^{j\theta}&-e^{j\theta}\\0&0\end{bmatrix}, \text{or } b_4\begin{bmatrix}0&0\\1&1\\0&0\\e^{j\theta}&-e^{j\theta}\end{bmatrix},$$

wherein $b_4$ is a constant, and $\theta \in [0, 2\pi]$; or $$b_5\begin{bmatrix}1&0\\0&1\\0&0\\0&0\end{bmatrix}, b_5\begin{bmatrix}1&0\\0&0\\0&1\\0&0\end{bmatrix}, b_5\begin{bmatrix}1&0\\0&0\\0&0\\0&1\end{bmatrix}, b_5\begin{bmatrix}0&0\\1&0\\0&1\\0&0\end{bmatrix}, b_5\begin{bmatrix}0&0\\1&0\\0&0\\0&1\end{bmatrix}, \text{or}$$

$$b_5\begin{bmatrix}0&0\\0&0\\1&0\\0&1\end{bmatrix},$$

wherein $b_5$ is a constant; or $$b_6\begin{bmatrix}1&0\\e^{j\theta}&0\\0&1\\0&0\end{bmatrix}, b_6\begin{bmatrix}1&0\\0&0\\0&1\\0&e^{j\theta}\end{bmatrix}, b_6\begin{bmatrix}1&0\\0&1\\e^{j\theta}&0\\0&0\end{bmatrix}, \text{or } b_6\begin{bmatrix}1&0\\0&1\\0&0\\0&e^{j\theta}\end{bmatrix},$$

wherein $b_6$ is a constant, and $\theta \in [0, 2\pi]$.

2. The apparatus according to claim 1, wherein in the antenna selection matrix, each column has at least one zero element.

3. The apparatus according to claim 1, wherein at least one of $W_1$ or $W_2$ is at least one of the following matrices:

$$a\begin{bmatrix}1\\0\end{bmatrix} \text{ or } a\begin{bmatrix}0\\1\end{bmatrix},$$

wherein $a$ is a constant; or $$b\begin{bmatrix}1\\0\\0\\0\end{bmatrix}, b\begin{bmatrix}0\\1\\0\\0\end{bmatrix}, b\begin{bmatrix}0\\0\\1\\0\end{bmatrix}, \text{or } b\begin{bmatrix}0\\0\\0\\1\end{bmatrix},$$

wherein $b$ is a constant.

4. The apparatus according to claim 1, wherein the antenna port comprises at least two antenna elements, and antenna element weighting vectors corresponding to at least two antenna ports are different.

5. The apparatus according to claim 1, wherein at least two antenna ports correspond to a same group of antenna elements, and corresponding weighting vectors on the same group of antenna elements are different.

6. A channel state information (CSI) reporting method, comprising:

receiving, by a CSI reporting apparatus, a reference signal sent by a base station;

selecting, by the CSI reporting apparatus, at least one precoding matrix from a codebook based on the reference signal, wherein the codebook comprises a precoding matrix W, and W meets: $W = W_1 \otimes W_2$, wherein $\otimes$ is a Kronecker product, and at least one of $W_1$ or $W_2$ is an antenna selection matrix used for selecting an antenna port for signal transmission; and sending, by the CSI reporting apparatus, CSI to the base station, wherein the CSI comprises at least one selected precoding matrix indicator (PMI), and the at least one selected PMI corresponds to the at least one selected precoding matrix;

wherein at least one of $W_1$ or $W_2$ is at least one of the following matrices:

$$b_4\begin{bmatrix}1&1\\e^{j\theta}&-e^{j\theta}\\0&0\\0&0\end{bmatrix}, b_4\begin{bmatrix}0&0\\0&0\\1&1\\e^{j\theta}&-e^{j\theta}\end{bmatrix}, b_4\begin{bmatrix}1&1\\0&0\\e^{j\theta}&-e^{j\theta}\\0&0\end{bmatrix}, b_4\begin{bmatrix}1&1\\0&0\\0&0\\e^{j\theta}&-e^{j\theta}\end{bmatrix},$$

$$b_4\begin{bmatrix}0&0\\1&1\\e^{j\theta}&-e^{j\theta}\\0&0\end{bmatrix}, \text{or } b_4\begin{bmatrix}0&0\\1&1\\0&0\\e^{j\theta}&-e^{j\theta}\end{bmatrix},$$

wherein $b_4$ is a constant, and $\theta \in [0, 2\pi]$; or $$b_5\begin{bmatrix}1&0\\0&1\\0&0\\0&0\end{bmatrix}, b_5\begin{bmatrix}1&0\\0&0\\0&1\\0&0\end{bmatrix}, b_5\begin{bmatrix}1&0\\0&0\\0&0\\0&1\end{bmatrix}, b_5\begin{bmatrix}0&0\\1&0\\0&1\\0&0\end{bmatrix}, b_5\begin{bmatrix}0&0\\1&0\\0&0\\0&1\end{bmatrix}, \text{or}$$

$$b_5\begin{bmatrix}0&0\\0&0\\1&0\\0&1\end{bmatrix},$$

wherein $b_5$ is a constant; or $$b_6\begin{bmatrix}1&0\\e^{j\theta}&0\\0&1\\0&0\end{bmatrix}, b_6\begin{bmatrix}1&0\\0&0\\0&1\\0&e^{j\theta}\end{bmatrix}, b_6\begin{bmatrix}1&0\\0&1\\e^{j\theta}&0\\0&0\end{bmatrix}, \text{or } b_6\begin{bmatrix}1&0\\0&1\\0&0\\0&e^{j\theta}\end{bmatrix},$$

wherein $b_6$ is a constant, and $\theta \in [0, 2\pi]$.

7. The method according to claim 6, wherein in the antenna selection matrix, each column has at least one zero element.

8. The method according to claim 6, wherein at least one of $W_1$ or $W_2$ is at least one of the following matrices:

$$a\begin{bmatrix}1\\0\end{bmatrix} \text{ or } a\begin{bmatrix}0\\1\end{bmatrix},$$

wherein a is a constant; or $$b\begin{bmatrix}1\\0\\0\\0\end{bmatrix}, b\begin{bmatrix}0\\1\\0\\0\end{bmatrix}, b\begin{bmatrix}0\\0\\1\\0\end{bmatrix}, \text{ or } b\begin{bmatrix}0\\0\\0\\1\end{bmatrix},$$

wherein b is a constant.

9. The method according to claim 6, wherein the antenna port comprises at least two antenna elements, and antenna element weighting vectors corresponding to at least two antenna ports are different.

10. The method according to claim 6, wherein at least two antenna ports correspond to a same group of antenna elements, and corresponding weighting vectors on the same group of antenna elements are different.

11. The apparatus according to claim 1, wherein at least one of $W_1$ or $W_2$ is at least one of the following matrices:

$$b_1\begin{bmatrix}1\\0\\e^{j\theta}\\0\end{bmatrix}, b_1\begin{bmatrix}0\\1\\0\\e^{j\theta}\end{bmatrix}, b_1\begin{bmatrix}1\\0\\0\\0\end{bmatrix}, b_1\begin{bmatrix}0\\0\\1\\e^{j\theta}\end{bmatrix}, b_1\begin{bmatrix}1\\0\\0\\e^{j\theta}\end{bmatrix}, \text{ or } b_1\begin{bmatrix}0\\1\\0\\0\end{bmatrix},$$

wherein $b_1$ is a constant, and $\theta \in [0,2\pi]$.

12. The apparatus according to claim 1, wherein at least one of $W_1$ or $W_2$ is at least one of the following matrices:

$$b_2\begin{bmatrix}1\\e^{j\theta_1}\\e^{j\theta_2}\\0\end{bmatrix}, b_2\begin{bmatrix}1\\0\\e^{j\theta_1}\\e^{j\theta_2}\end{bmatrix}, b_2\begin{bmatrix}1\\e^{j\theta_1}\\0\\e^{j\theta_2}\end{bmatrix}, \text{ or } b_2\begin{bmatrix}0\\1\\e^{j\theta_1}\\e^{j\theta_2}\end{bmatrix},$$

wherein $b_2$ is a constant, and $\theta_1,\theta_2 \in [0,2\pi]$.

13. The apparatus according to claim 1, wherein at least one of $W_1$ or $W_2$ is at least one of the following matrices:

$$c\begin{bmatrix}1\\0\\0\\0\\0\\0\\0\\0\end{bmatrix}, c\begin{bmatrix}0\\1\\0\\0\\0\\0\\0\\0\end{bmatrix}, c\begin{bmatrix}0\\0\\1\\0\\0\\0\\0\\0\end{bmatrix}, c\begin{bmatrix}0\\0\\0\\1\\0\\0\\0\\0\end{bmatrix}, c\begin{bmatrix}0\\0\\0\\0\\1\\0\\0\\0\end{bmatrix}, c\begin{bmatrix}0\\0\\0\\0\\0\\1\\0\\0\end{bmatrix}, c\begin{bmatrix}0\\0\\0\\0\\0\\0\\1\\0\end{bmatrix}, \text{ or } c\begin{bmatrix}0\\0\\0\\0\\0\\0\\0\\1\end{bmatrix},$$

or a quantity of non-zero elements in the matrix is two, three, four, five, six, or seven, wherein c is a constant.

14. The method according to claim 6, wherein at least one of $W_1$ or $W_2$ is at least one of the following matrices:

$$b_1\begin{bmatrix}1\\0\\e^{j\theta}\\0\end{bmatrix}, b_1\begin{bmatrix}0\\1\\0\\e^{j\theta}\end{bmatrix}, b_1\begin{bmatrix}1\\0\\0\\0\end{bmatrix}, b_1\begin{bmatrix}0\\0\\1\\e^{j\theta}\end{bmatrix}, b_1\begin{bmatrix}1\\0\\0\\e^{j\theta}\end{bmatrix}, \text{ or } b_1\begin{bmatrix}0\\1\\0\\0\end{bmatrix},$$

wherein $b_1$ is a constant, and $\theta \in [0,2\pi]$.

15. The method according to claim 6, wherein at least one of $W_1$ or $W_2$ is at least one of the following matrices:

$$b_2\begin{bmatrix}1\\e^{j\theta_1}\\e^{j\theta_2}\\0\end{bmatrix}, b_2\begin{bmatrix}1\\0\\e^{j\theta_1}\\e^{j\theta_2}\end{bmatrix}, b_2\begin{bmatrix}1\\e^{j\theta_1}\\0\\e^{j\theta_2}\end{bmatrix}, \text{ or } b_2\begin{bmatrix}0\\1\\e^{j\theta_1}\\e^{j\theta_2}\end{bmatrix},$$

wherein $b_2$ is a constant, and $\theta_1,\theta_2 \in [0,2\pi]$.

16. The method according to claim 6, wherein at least one of $W_1$ or $W_2$ is at least one of the following matrices:

$$c\begin{bmatrix}1\\0\\0\\0\\0\\0\\0\\0\end{bmatrix}, c\begin{bmatrix}0\\1\\0\\0\\0\\0\\0\\0\end{bmatrix}, c\begin{bmatrix}0\\0\\1\\0\\0\\0\\0\\0\end{bmatrix}, c\begin{bmatrix}0\\0\\0\\1\\0\\0\\0\\0\end{bmatrix}, c\begin{bmatrix}0\\0\\0\\0\\1\\0\\0\\0\end{bmatrix}, c\begin{bmatrix}0\\0\\0\\0\\0\\1\\0\\0\end{bmatrix}, c\begin{bmatrix}0\\0\\0\\0\\0\\0\\1\\0\end{bmatrix}, \text{ or } c\begin{bmatrix}0\\0\\0\\0\\0\\0\\0\\1\end{bmatrix},$$

or a quantity of non-zero elements in the matrix is two, three, four, five, six, or seven, wherein c is a constant.

* * * * *